Figure 1:
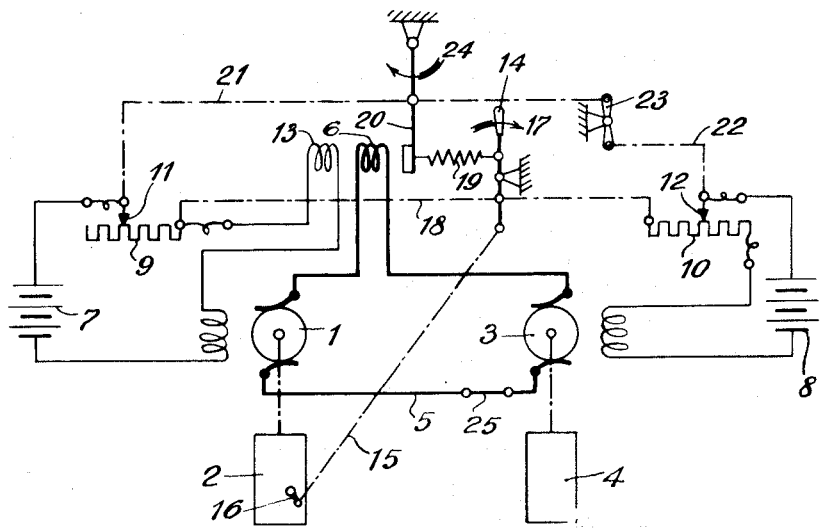

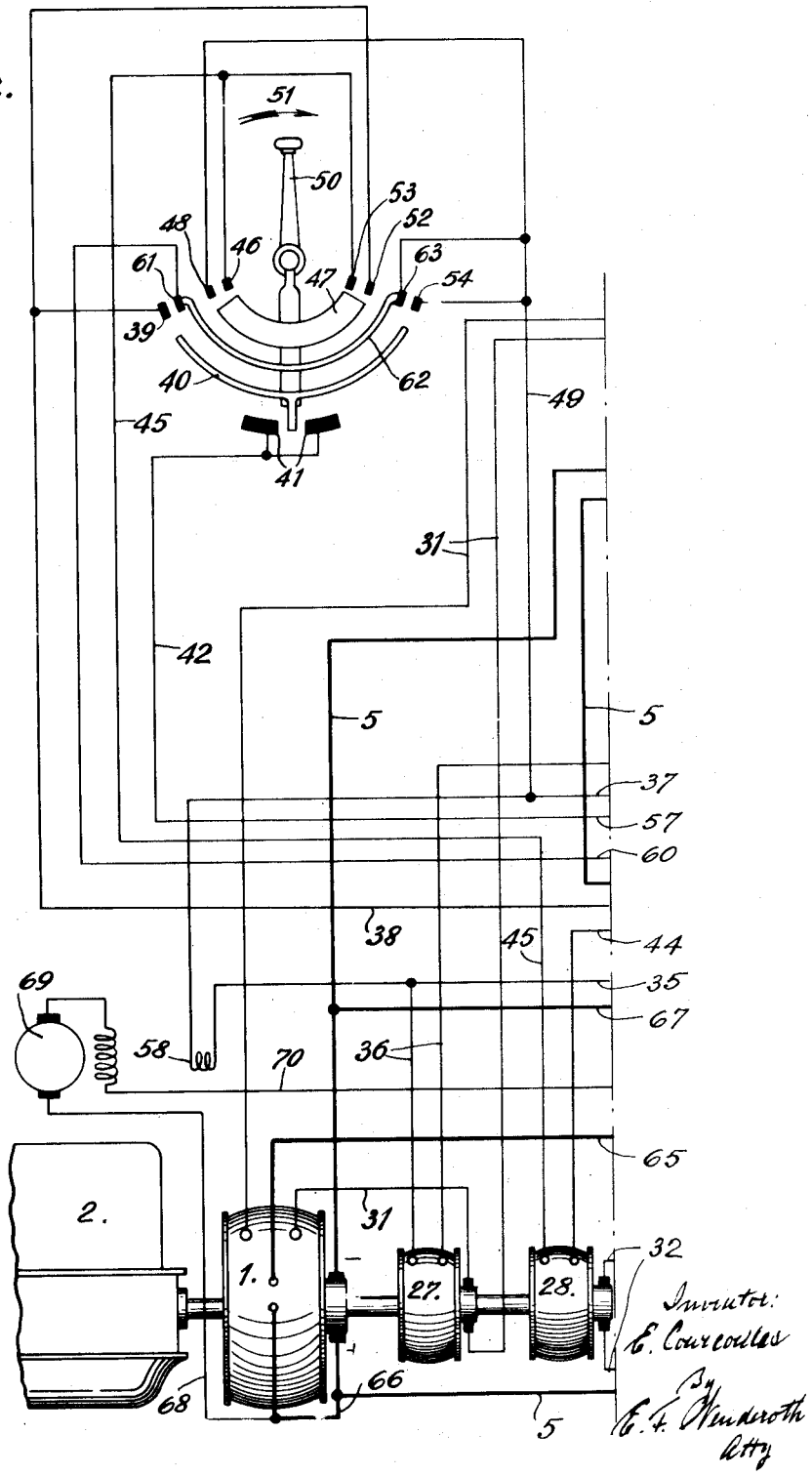

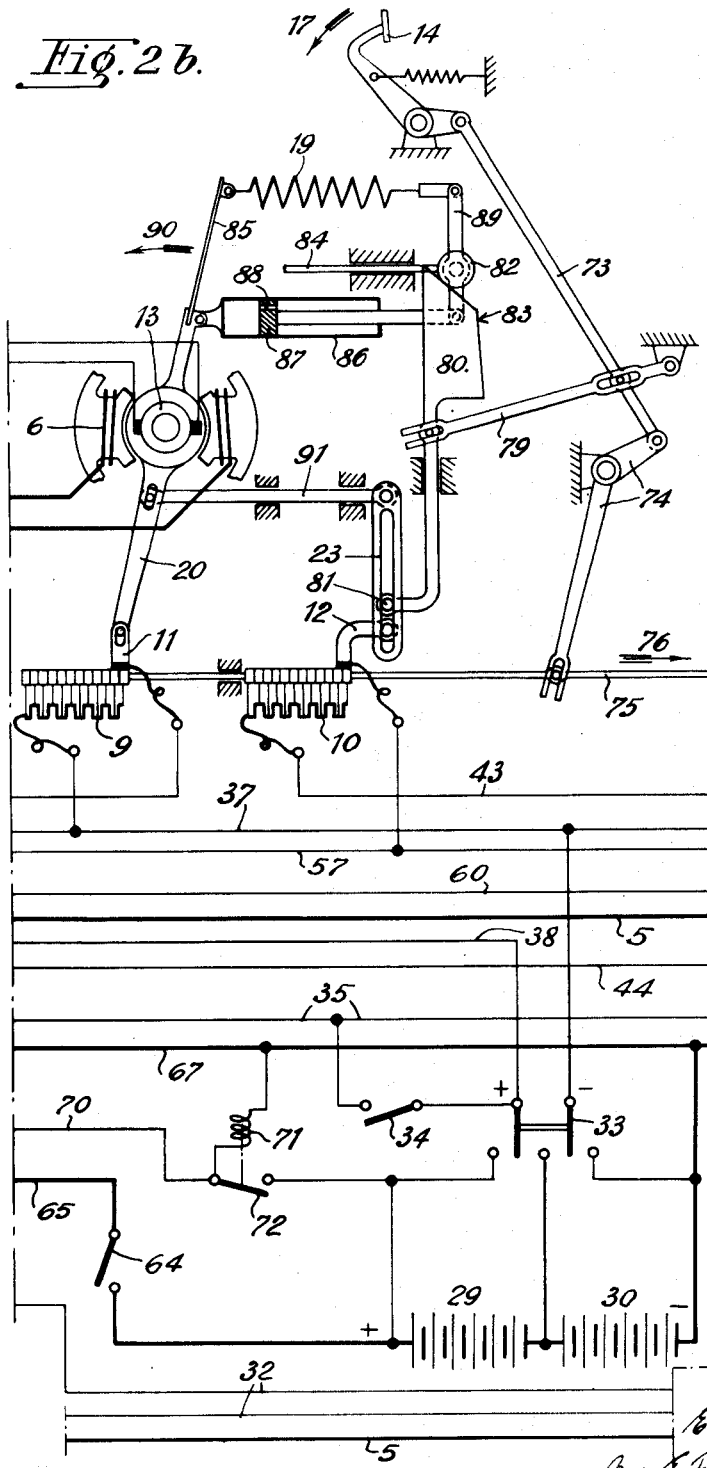

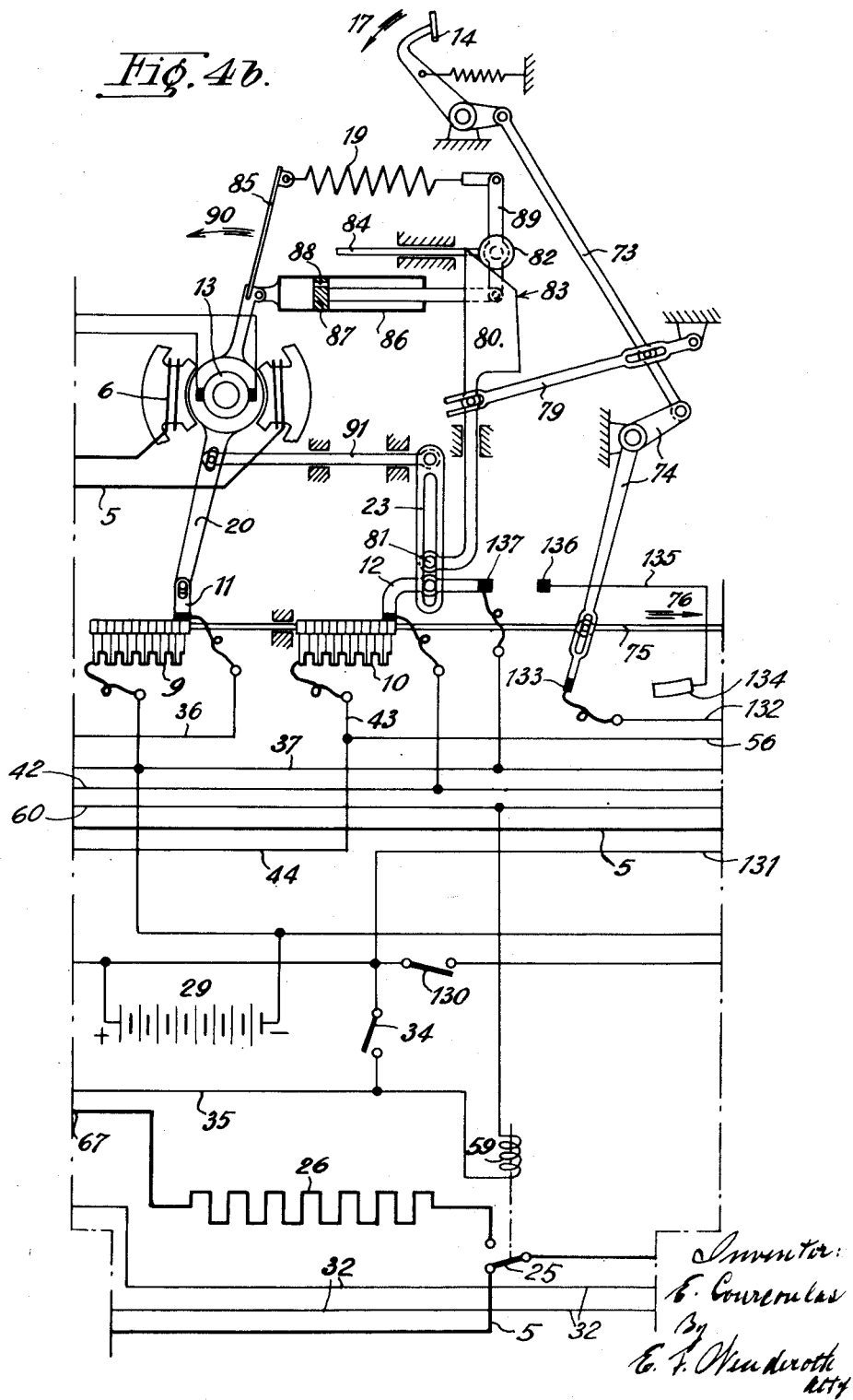

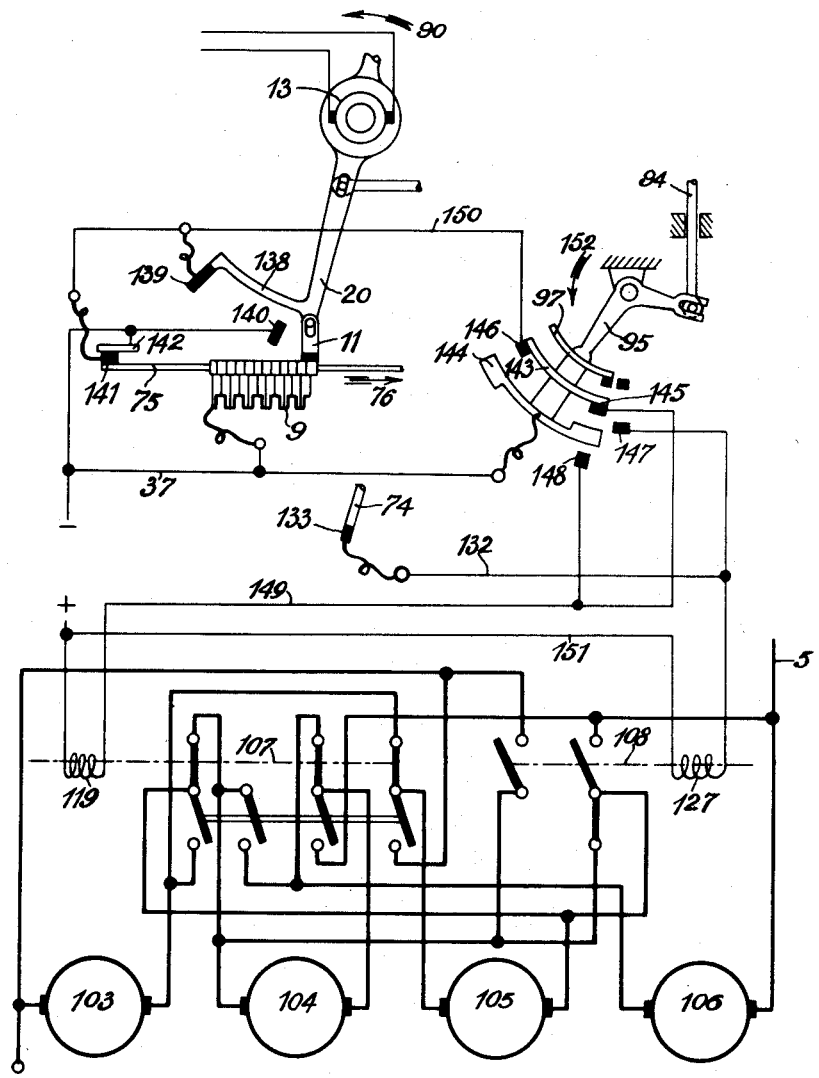

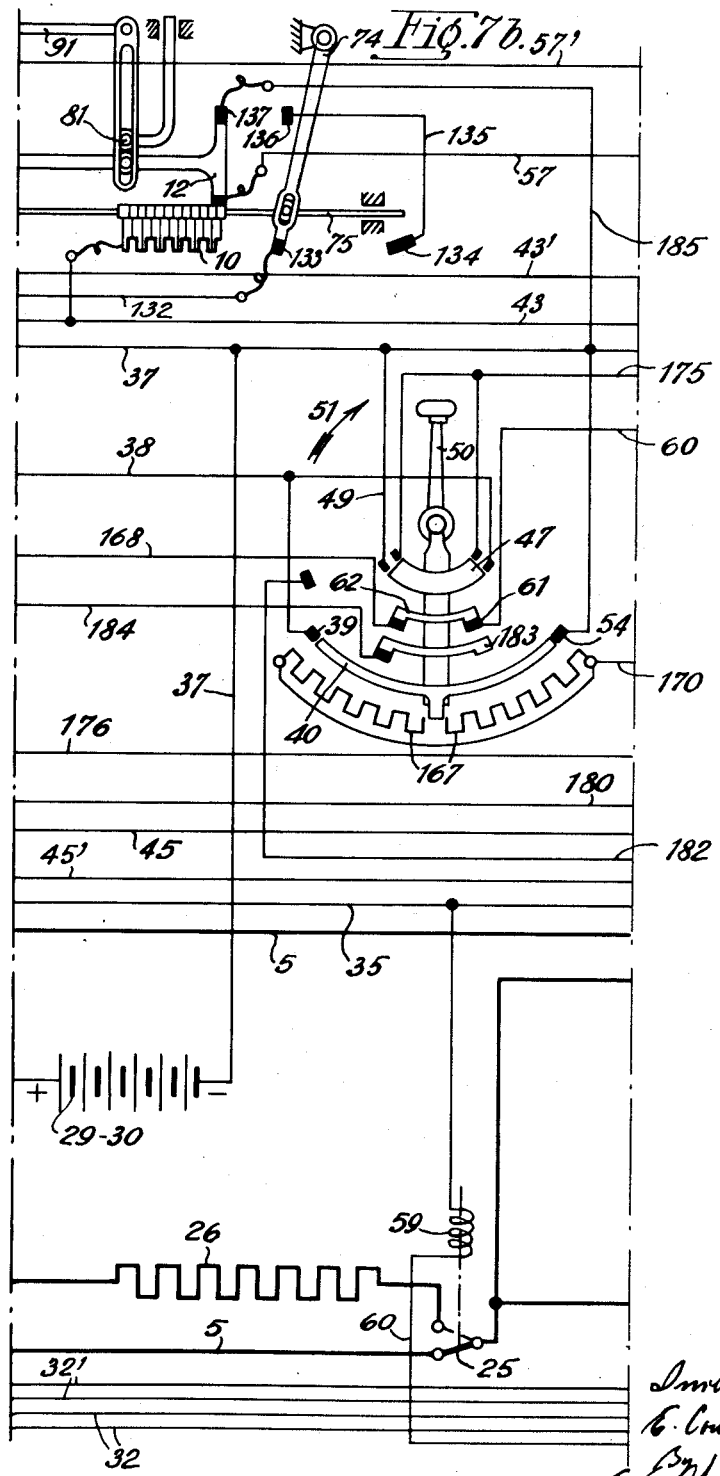

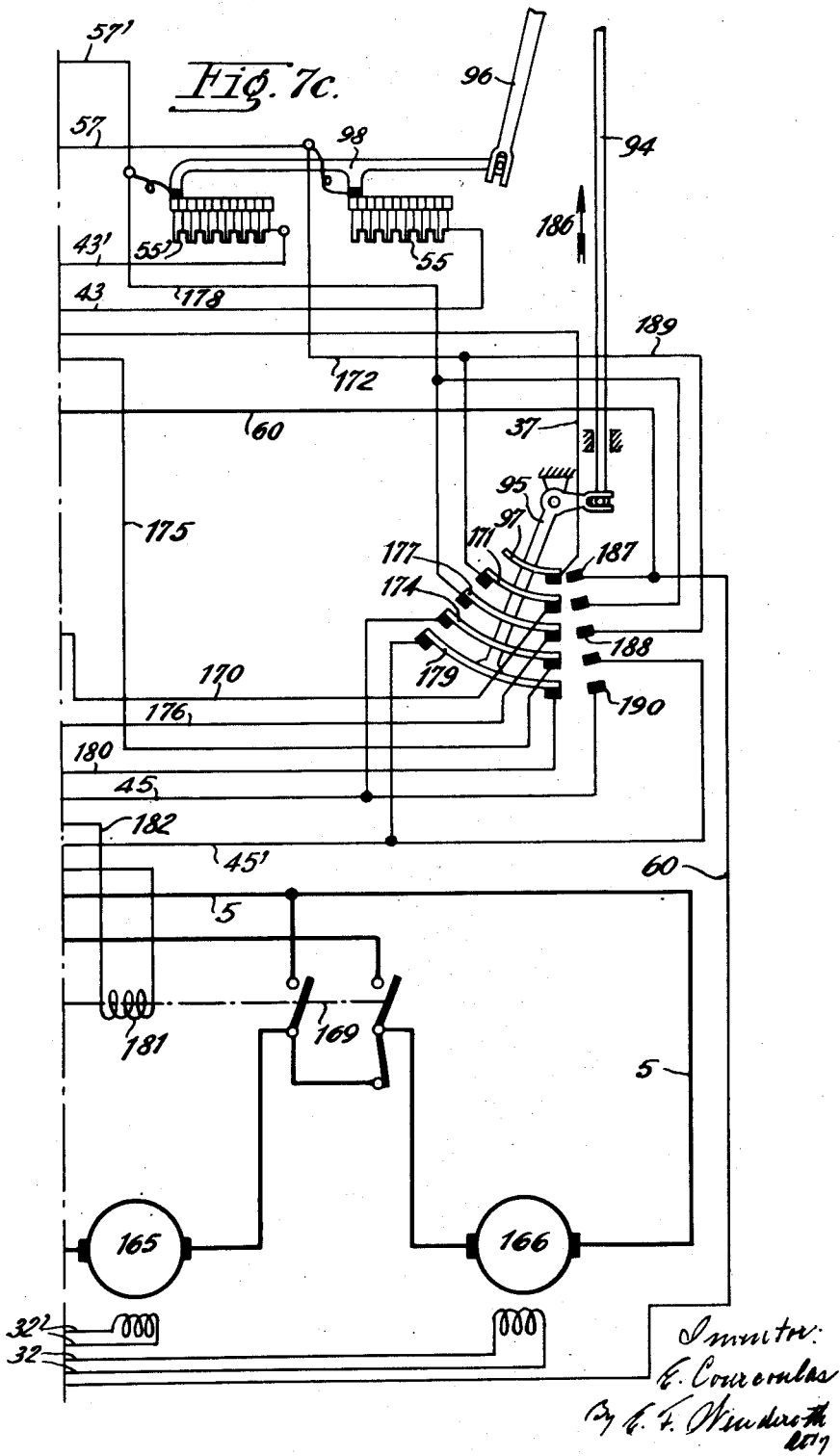

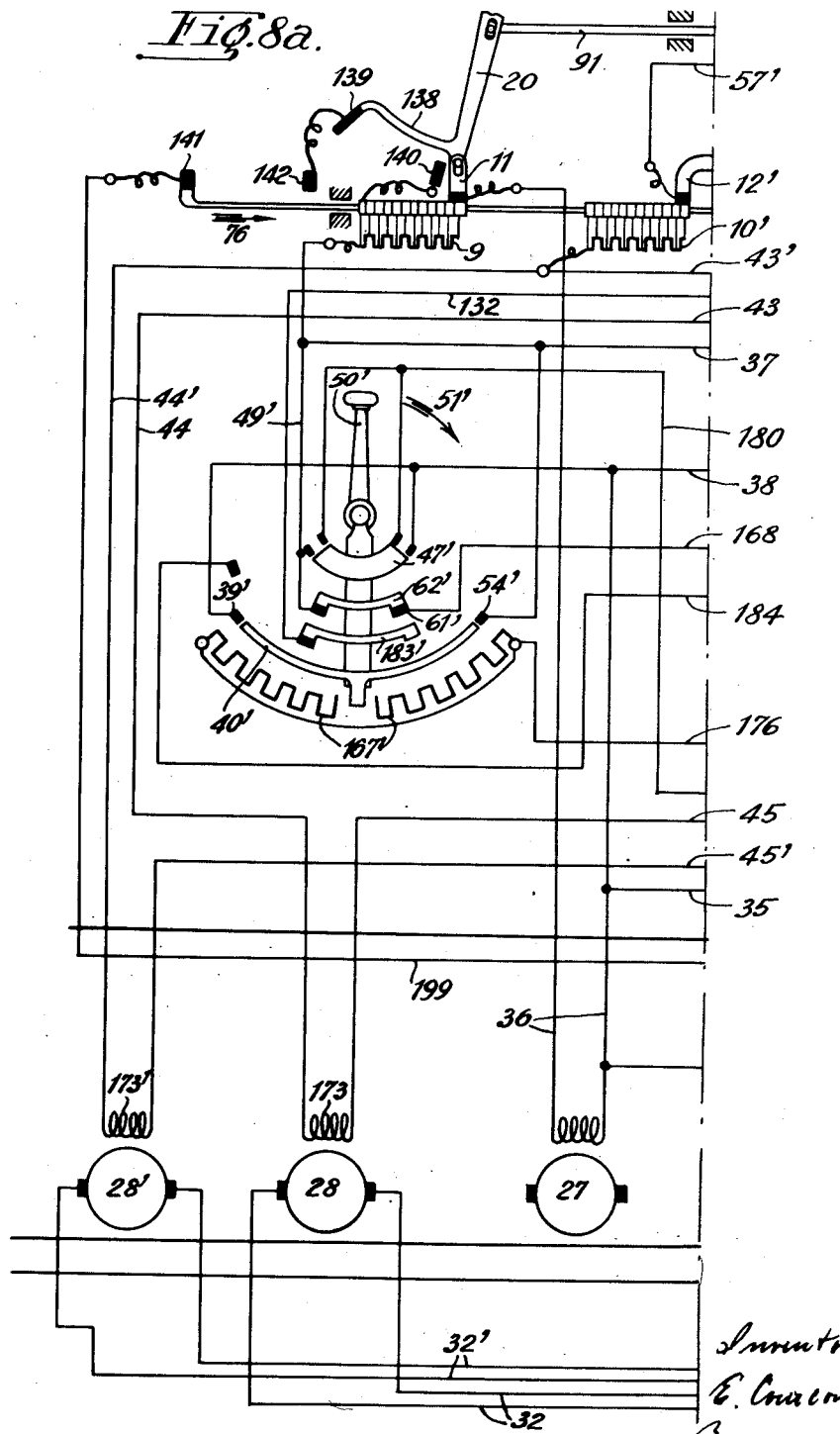

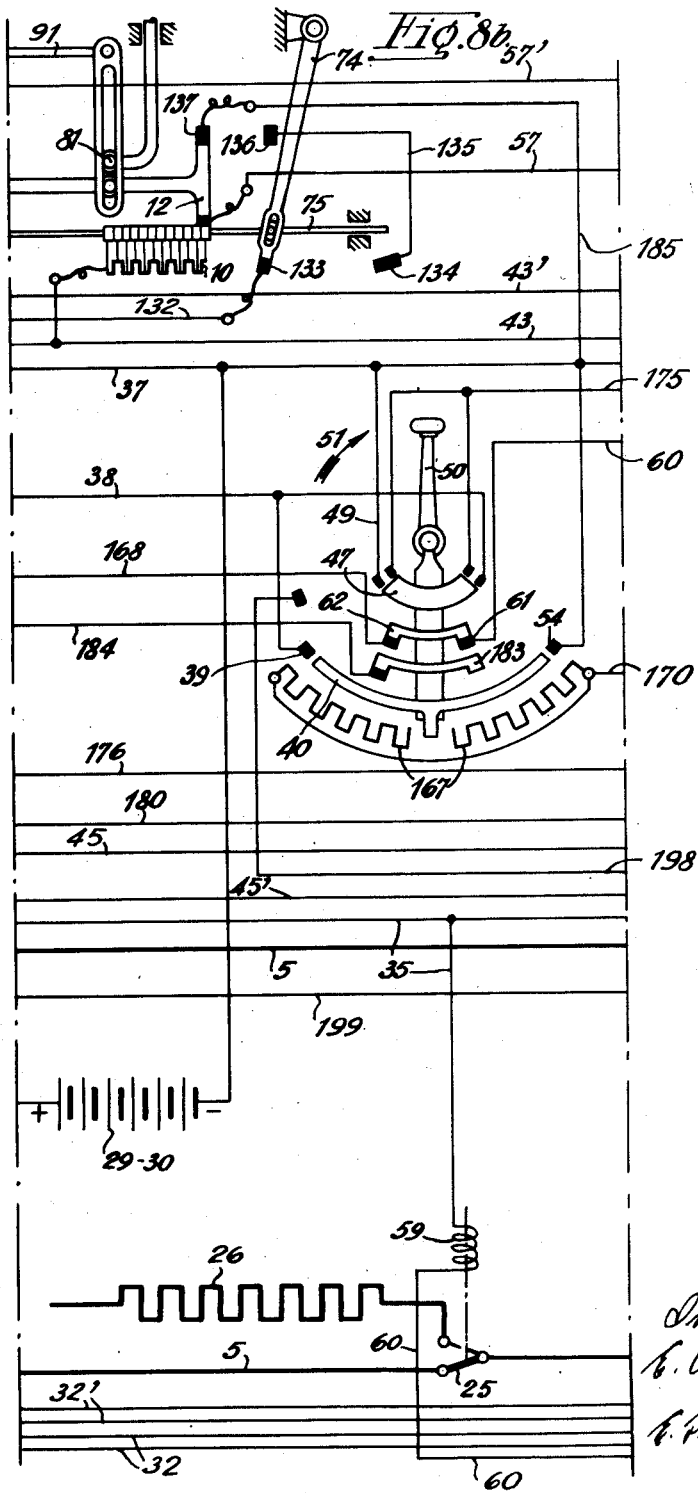

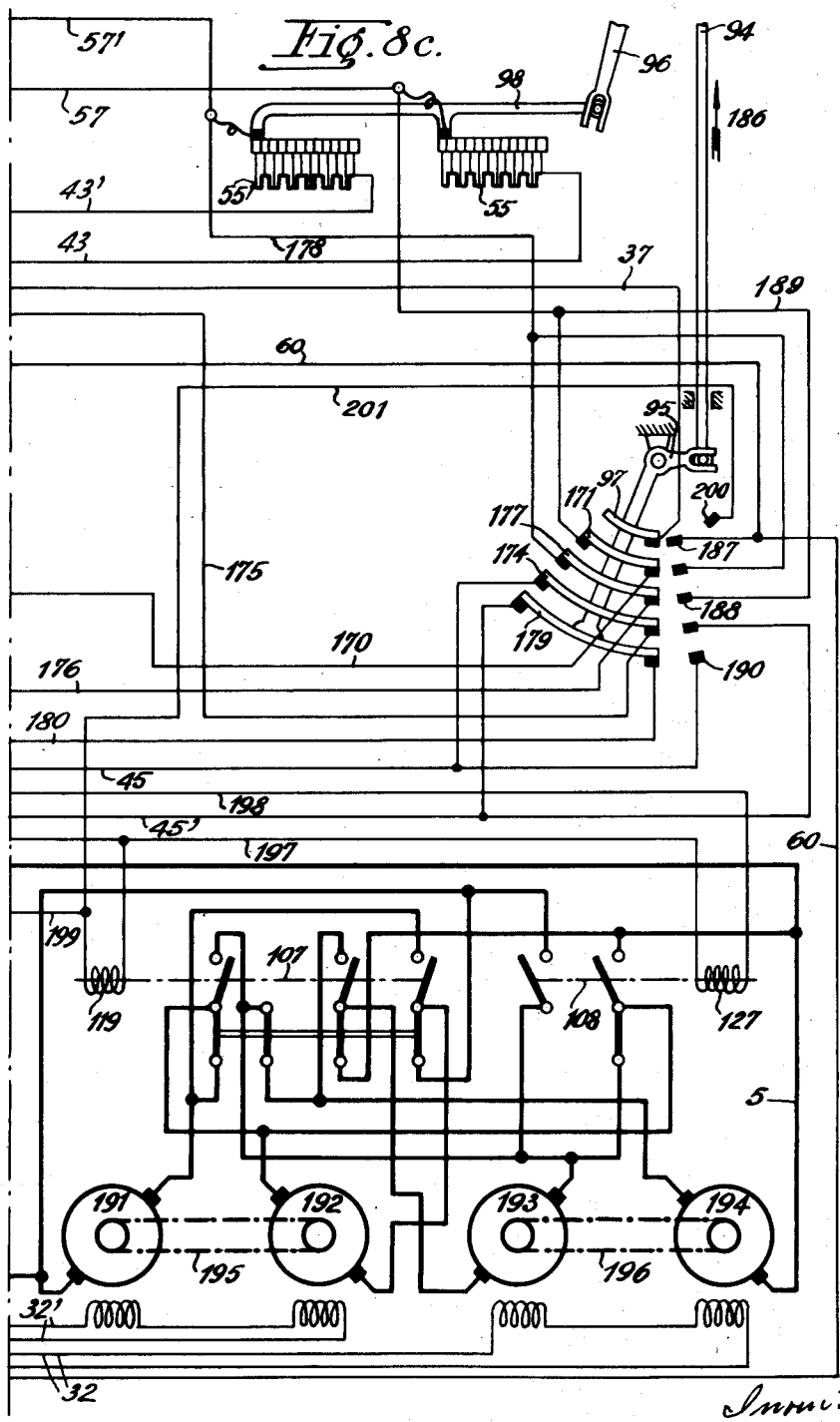

Patented Apr. 2, 1940

2,195,766

UNITED STATES PATENT OFFICE 2,195,766

ARRANGEMENT FOR TRANSFORMING MECHANICAL ENERGY INTO MECHANICAL ENERGY WITH INTERMEDIATE TRANSFORMATION INTO ELECTRICAL ENERGY

Emmanuel Courcoulas, Asnieres, France, assignor to the firm "Sebrev" Société d'Etudes et de Brevets, Geneva, Switzerland Application March 12, 1938, Serial No. 195,620
In Switzerland May 28, 1937

30 Claims. (Cl. 290—17)

The invention relates to systems intended for the transfer of mechanical energy into energy of the same kind by intermediate conversion into electrical energy.

The system comprises for this purpose at least one primary source of mechanical energy such as an electric motor producing a driving torque dependent on the energy input applied to a prime mover driving it, and a control member making it possible to vary as desired the energy input to the prime mover in question. This prime mover may be a water turbine or a steam engine with its sluice or throttle valve, an internal combustion engine with an accelerator by which the injection or the energy input of fuel or of an explosive mixture can be varied, an electric motor with its regulating rheostat, or the like.

The system additionally comprises a generator group of at least one unit generating electrical energy, which is coupled to the primary source of mechanical energy and imposes on it a resisting torque dependent on the load demand of a motor group of at least one unit. This motor group absorbs practically all the electrical energy produced by the generator group and delivers it in the form of secondary mechanical energy, constituting the energy which it is desired to obtain after electrical transformation.

According to my invention means are provided by which the magnetic fluxes of the units in the generator and motor groups are subjected to change each time the feed supply to the prime mover varies; in consequence of which a variation is also made in the strength of current supplied by the generator group to the motor group. At the same time a change is made in the value of the resisting torque exerted on the moving part of a regulating device. This moving part additionally is subjected to an electromagnetic force proportional to the resisting torque of the generator group which resisting torque produces a reduction of flux in the units of this group and an increase of flux in the units of the motor group at such times as the electromagnetic force exceeds the opposing or resisting force, producing a momentary unbalance in the regulating device.

It is possible for example to provide either for direct action of the member controlling the input of the fluid or the like on the flux values to be changed, or to derive this action from the primary source of mechanical energy by utilising for this purpose for instance the mean pressure maintaining in the cylinders in the case of a heat engine.

When the motor group comprises a single unit, the variation of its magnetic flux can be obtained for instance by providing for this unit independent excitation capable of regulation. In the case of several units my invention can be extended to include the further feature of varying the method of connecting the units together, and similar changes can be provided in the case of the generator group.

According to another embodiment of this invention, the units of the motor group can be divided into at least two sub-groups, each sub-group having at least one separate exciter, these exciters however being compulsory connected together and to the primary source of mechanical energy, means being provided making it possible to vary independently the value and the direction of the excitation of the exciters in each sub-group, said means making it possible to distribute all the electrical energy absorbed by the motor group at will between the sub-groups of the latter.

This arrangement presents particular advantages when the units of the motor group are divided into two sub-groups and when the system is applied to any vehicle, by making one of the sub-groups act on the driving means on one side of the vehicle and the other sub-group on the driving means on the other side of the vehicle. By actuating the means whereby all the electrical energy absorbed by the motor group can be distributed at will between the sub-groups of the latter, it is possible to move and to direct the vehicle with facility in all directions and at all speeds.

The vehicle in question can for example take the form of a land vehicle having wheels or caterpillars, or it may be a boat actuated by paddle-wheels, propellers, etc.

Finally, it is clear that the claimed system constitutes a reversible assembly, since it absorbs and delivers energy in an identical form. Reverse operation may for example be utilised for regenerating braking when the system is fed by an original source of electrical energy.

Figure 2C:
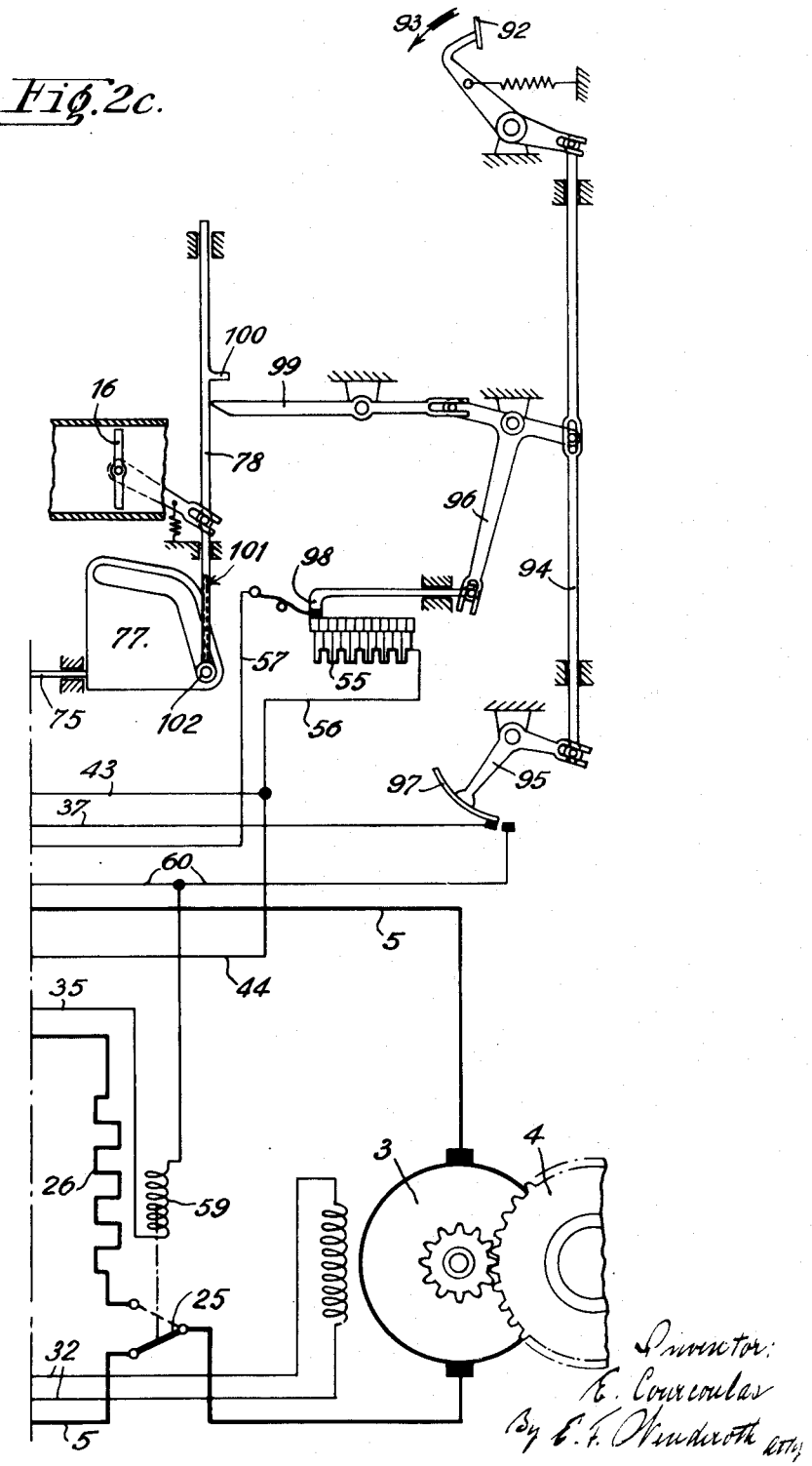

The accompanying drawing shows diagrammatically several constructional forms of the subject-matter of my invention, given solely as illustrative and by way of example, and therein Figure 1 is a greatly simplified typical diagram intended to illustrate the principle constituting the basis of the invention, Figure 2a, 2b and 2c combine together to form a complete diagram of one form of construction, in which a single electric generator driven by an internal combustion engine feeds a reversible electric motor which can also act as a brake, the complete assembly may be depicted by arranging these three views side by side.

Figure 3:
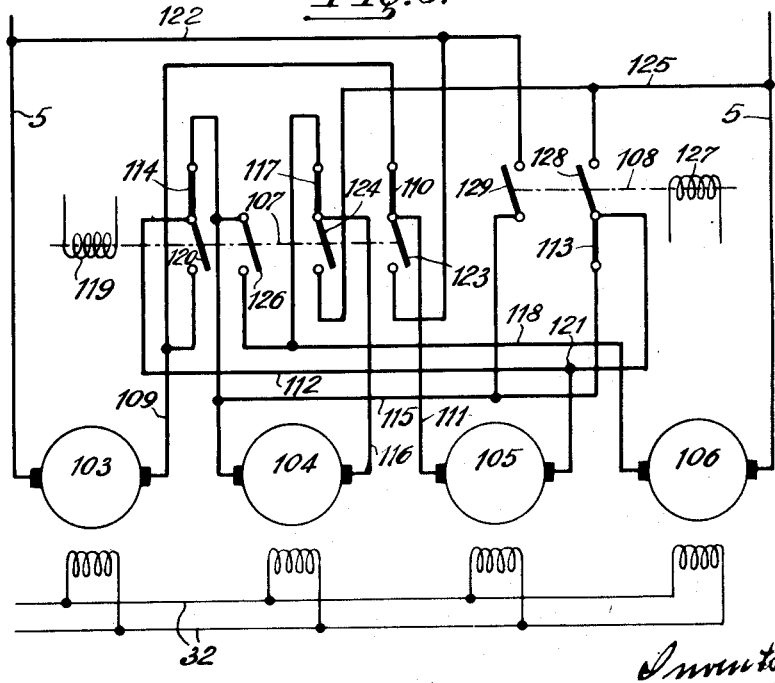
Figure 4A:
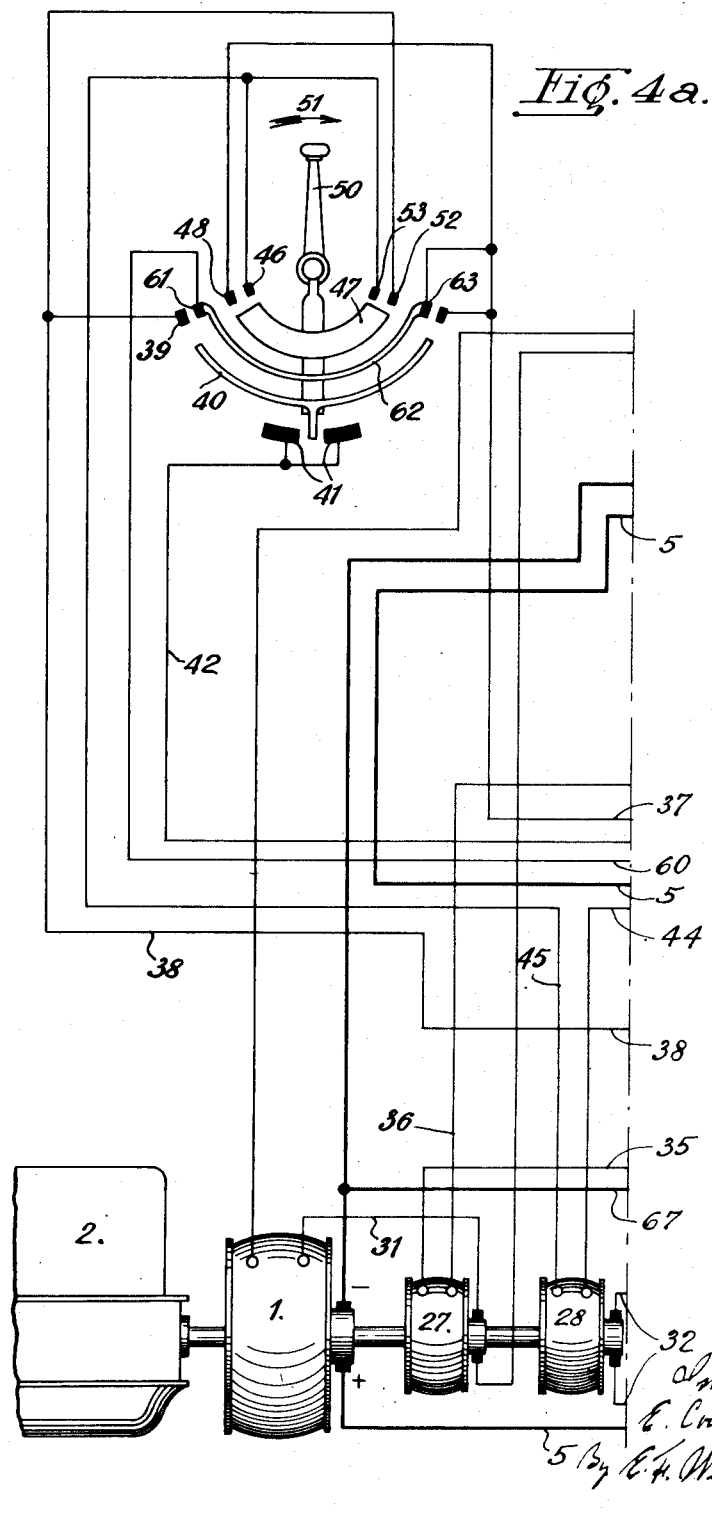
Figure 4C:
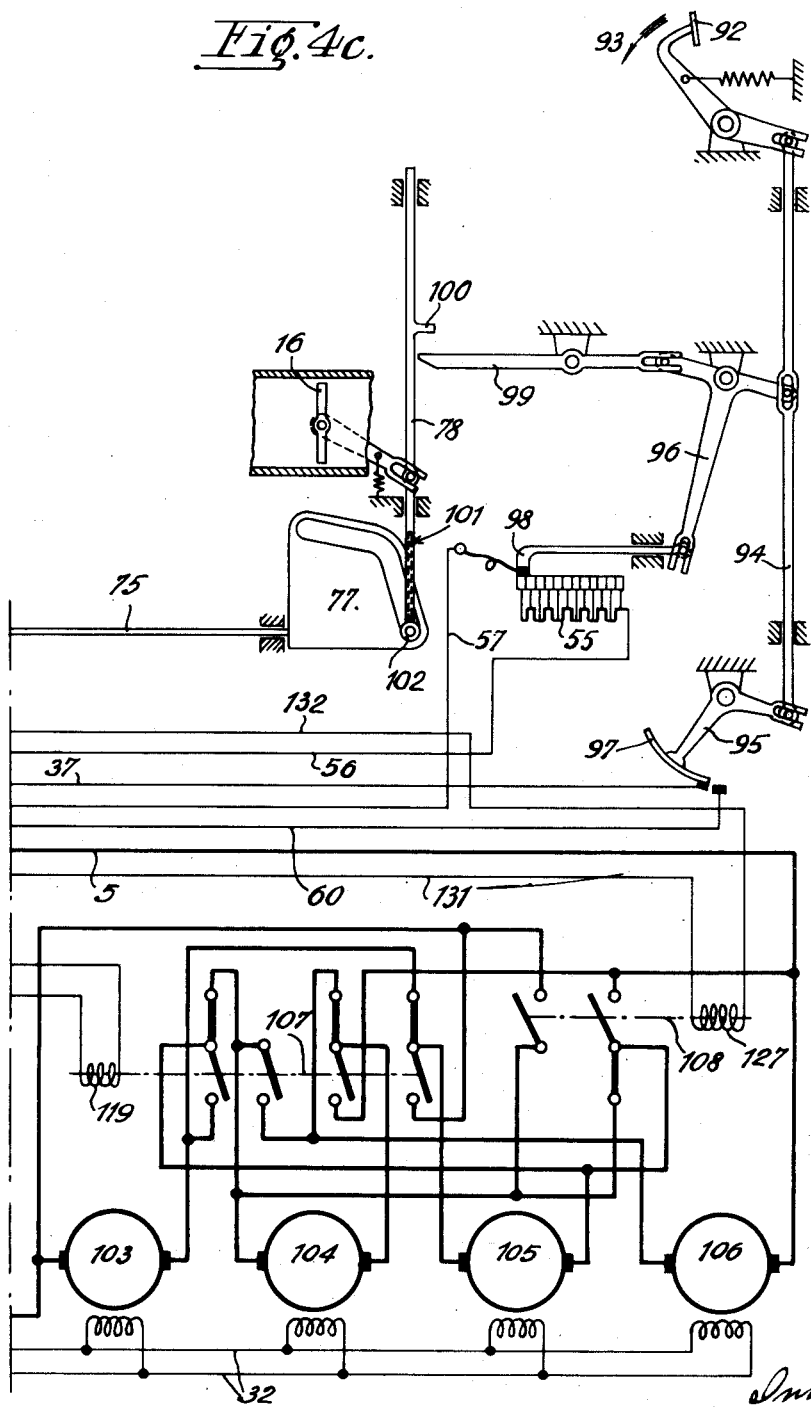

Figure 3 is a diagram showing the manner in which four motor units can be coupled together by means of two multipole change-over switches, Figures 4a, 4b, 4c, when joined together side by side, constitute a complete diagram of a second form of construction in which a single electric generator driven by an internal combustion engine feeds four electric motors all driving a mechanical member at the same speed, the motors being connected together electrically according to the diagram of Figure 3.

Figure 6A:
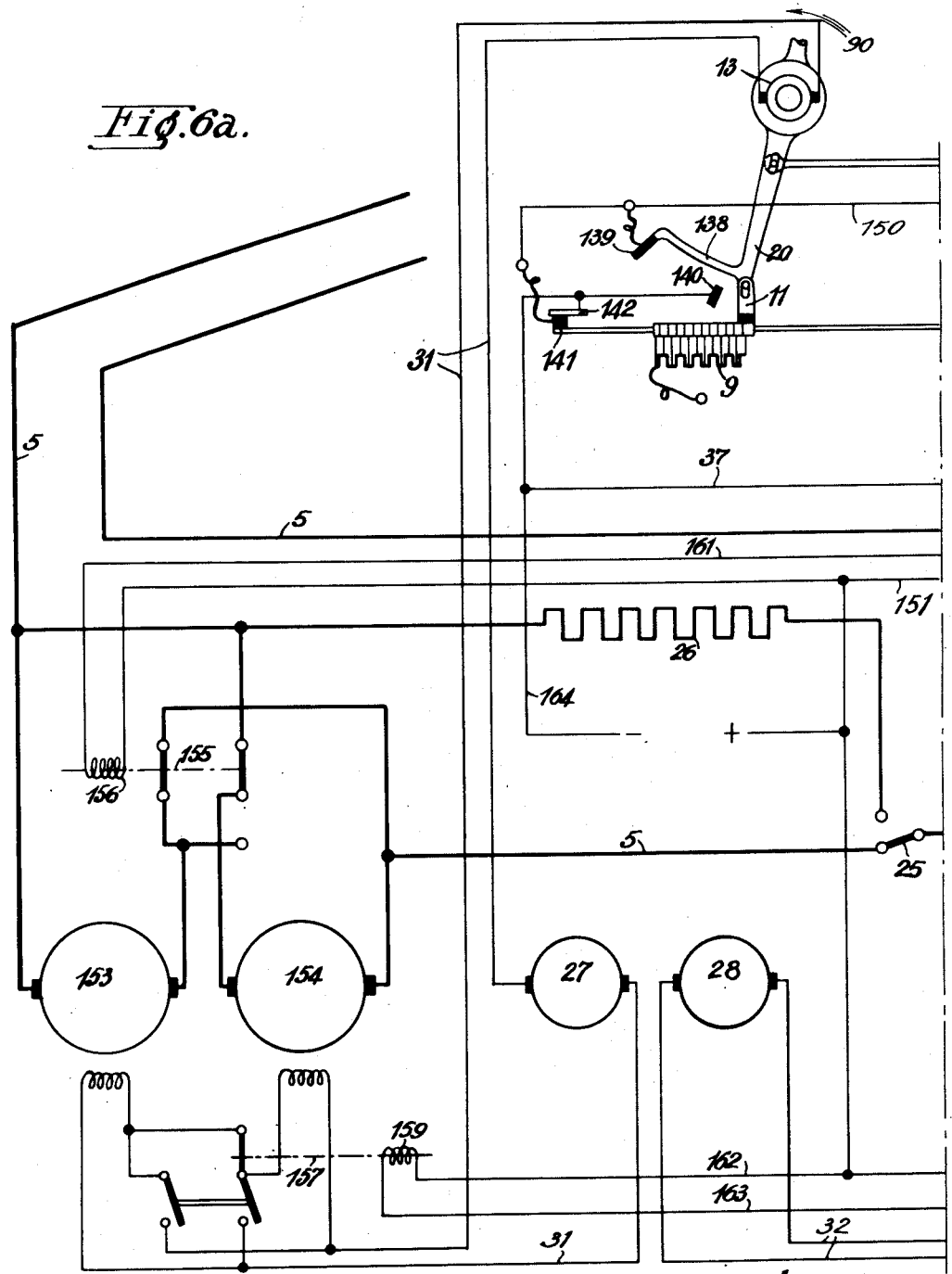
Figure 6B:
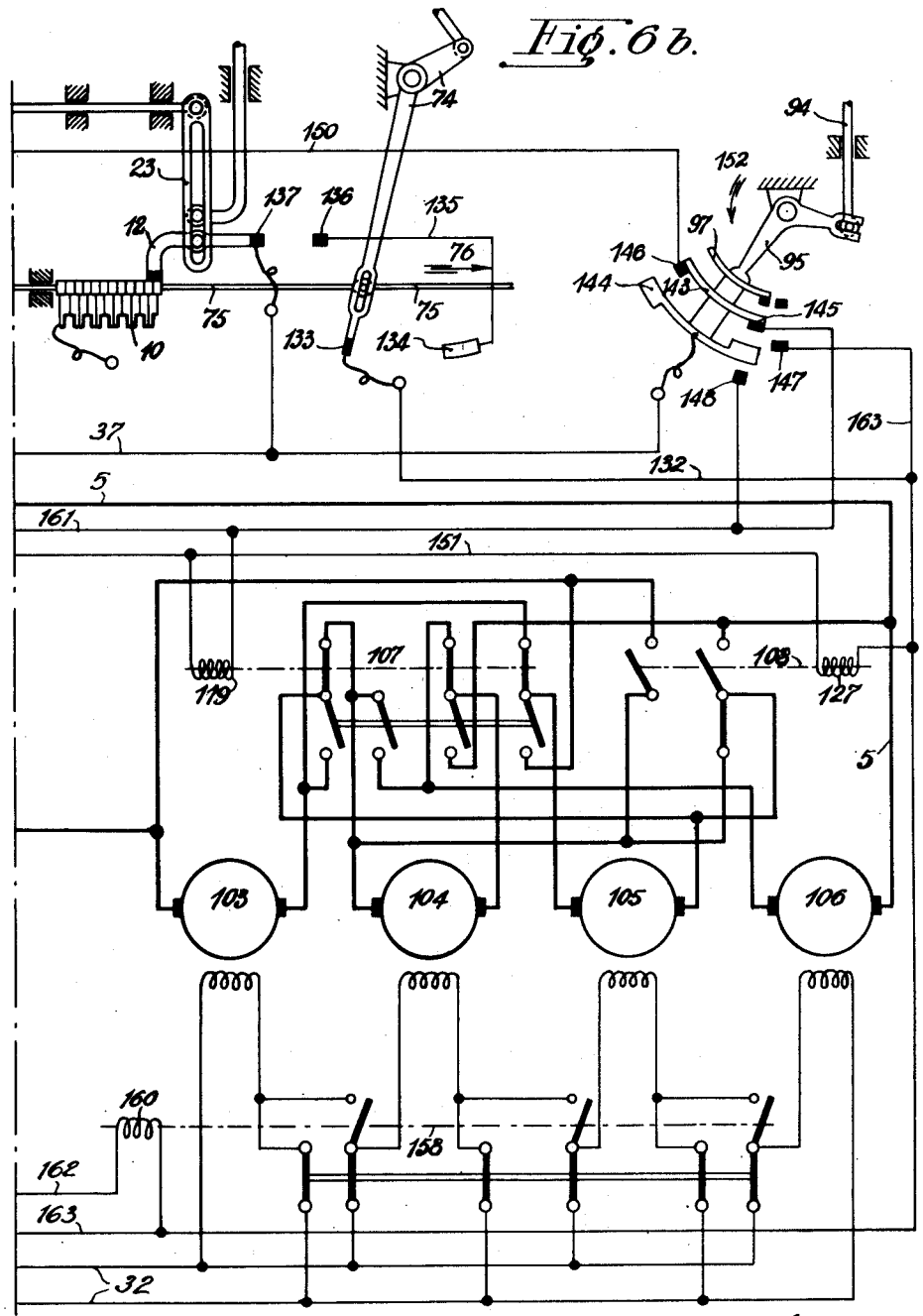

Figure 5 is a partial diagram showing the manner in which entirely automatic operation of the connections provided in the diagram of Figure 4 can be obtained, and Figure 6a, 6b, when joined together side by side, constitute a complete diagram of automatic connections in the case of two generator units and four motor units, with possible modification of the connections of the armatures and fields for both generator and motor groups.

Figure 7A:
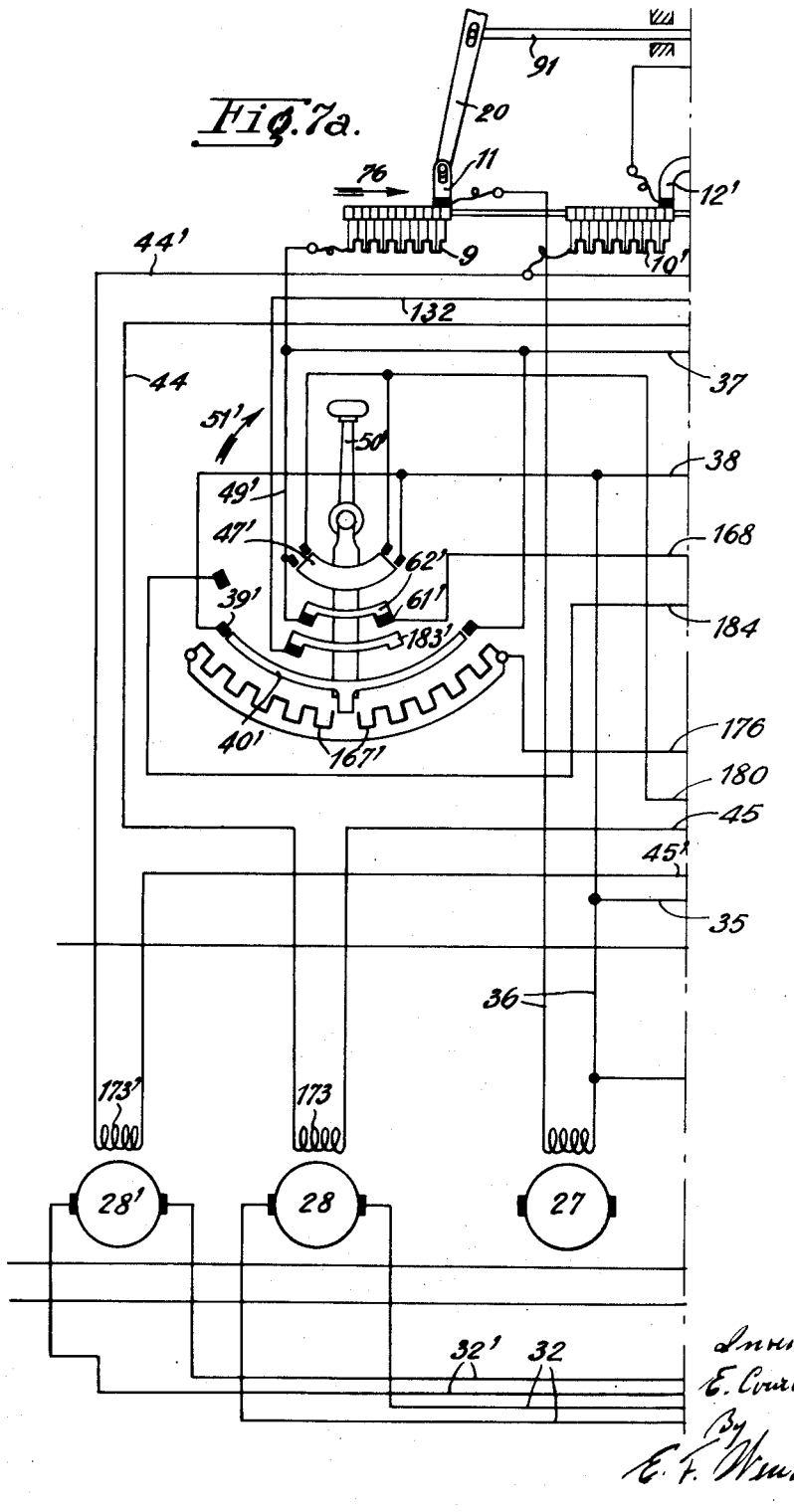

Figures 7a, 7b, 7c, when joined together side by side, constitute the complete diagram of a system comprising two motor sub-groups and relating to the case of driving a vehicle. This diagram shows said system with the exception of the generator members, i. e. in the absence of the internal combustion engine and the generator. The main circuit 5 of the motors is therefore broken off.

Figures 8a, 8b, 8c, when joined together side by side, constitute a complete diagram of a system of the same type as Figure 7, but comprising two motors in each sub-group.

GENERAL DESCRIPTION

Referring to the diagrammatic Figure 1, an electric generator 1 is directly coupled to and driven by an internal combustion engine 2 constituting the primary source of mechanical energy for the plant. An electric motor 3 driven by the electrical energy thus produced transforms and delivers this latter in the form of secondary mechanical energy capable of driving any machine such as that diagrammatically represented by the rectangle 4.

The motor 3 absorbs substantially all the energy produced by the generator 1, as indicated by the heavy lines of the circuit 5 inter-connecting the armatures of these two machines. The coil 6 of a regulating device inserted in this circuit absorbs only a negligible amount of energy.

Generator 1 and motor 3 are provided with separate excitation, derived for instance from a battery 7 for the generator and a battery 8 for the motor, the value of the corresponding excitation fluxes being capable of variation by rheostats or other suitable controls 9 and 10 respectively, having corresponding sliders 11 and 12 movable therealong. The field current of the generator 1 also passes through a coil 13 of the regulating device.

A rotary member 14, which can be displaced as desired by hand or foot, constitutes the accelerator member or pedal of the internal combustion engine 2, as indicated diagrammatically by the dotted line 15 between said pedal or lever and the lever 16 of a butterfly valve, not shown. The movement of this valve increases the input of the explosive mixture according to a predetermined law when the member 14 is moved in the direction of the arrow 17.

Accelerator member 14 is mechanically connected to the resistance of the rheostats 9 and 10 as indicated by the dotted line 18 and is also connected as by elastic means indicated diagrammatically as a spring 19, to the moving part 20 of the regulating device.

Thus by actuating the member 14 in the direction of the arrow 17 admission or energy input is increased, thereby increasing the torque of the internal combustion engine 2. Simultaneously therewith the excitation of the generator 1 and that of the motor 3 are caused to vary because of the bodily movement of the resistances themselves the rheostats 9 and 10 relative to their sliders 11 and 12. When the accelerator is opened, the excitation of both the generator and the motor is increased, which causes the flux in both machines to rise. The spring 19 is tensioned by movement of the member 14, so that its biasing action on the moving part 20 of the regulating device is increased. This opposing force or biasing action, which in practice will be caused to vary proportionately to the torque developed by the internal combustion engine, opposes the combined electro-magnetic action of the coils 6 and 13, the action of which latter is proportional to the resisting torque of the generator 1, since it combines a factor proportional to the current supplied to the line 5, with a factor which is dependent on the field current of the generator, and consequently is proportional to its field flux, care being taken to ensure proper generator core design.

Depending upon whether or not the electromagnetic action or resisting torque overcomes the purely mechanical biasing action of the spring 19, the moving part 20 of the regulating device will turn to one side or the other in Figure 1, thus moving the sliders 11 and 12 of the field rheostats 9 and 10 by means of mechanical connections indicated diagrammatically by dotted lines 21, 22, reversing means comprising a transmission lever such as the rocker 23 ensuring that the sliders are moved in opposite directions upon movement of part or arm 20.

When the combined electro-magnetic action of the coils 6 and 13 overcomes that of the spring 19 and by consequence the moving part 20 of the regulating device rotates in the direction of the arrow 24, the excitation of the generator diminishes, while that of the motor increases. In short the action of the moving part of the regulator tends to diminish the flux of the generator 1 and to increase that of the motor 3.

The described system could be applied for example to the drive of a motor rail vehicle, the vehicle being controlled by the manipulation of the accelerator lever 14; and, when it is desired to stop the motor 3 completely or to test the system on open circuit, by a switch 25 in the circuit 5. The driven member 4 would then be constituted by at least one motor axle of the vehicle.

The engine 2 being in action, all that is necessary to ensure starting and acceleration of the vehicle is to close the switch 25 and then to accelerate the engine. The acceleration of the engine 2, caused by increasing the fuel supply, increases the developed driving torque and to the extent that this torque exceeds the resisting torque, back E. M. F. of the generator 1, the generator speed being accelerated and the power which it supplies to its terminals 5 increasing.

The developed voltage likewise rises because of the reduction of the resistance in the field rheostat 9, due to the movement of the lever 14 giving rise to a corresponding increase of flux produced. A simultaneous increase of the field flux of the motor which momentarily exceeds the demagnetizing action brought about by operation of the regulator 20, builds up therein the torque and energy necessary for the corresponding acceleration of the vehicle, increased energy being available from the circuit 5.

Upon rise in output current flow in circuit 5 the excitation of the coil 6 increases, while upon decrease of value of resistance 9, the excitation of coil 13 likewise increases, the combined action tending to cause the moving part 20 of the regulating device to turn in the direction of a reduction of flux in the generator 1 and an increase of flux in the motor 3, i. e. in the direction of arrow 24, in order to regulate the resisting torque of the generator and thus to tend to prevent any reduction of its speed, while maintaining constant the quantum of energy transmitted from the generator to the motor.

For satisfactory operation this regulating action should in no case come into operation except when the load demand tends to exceed the instantaneously developed torque of the internal combustion engine 3 operating at its maximum efficiency. This is precisely what happens in the system disclosed, since the moving part 20 of the regulating device is subjected to increased pull by the spring 19 upon increase in the driving torque caused by movement of member 14 in the direction of the arrow 17, and does not start its regulatory action until the attraction of coils 6 and 13 exceeds the biasing action of the spring 19.

In practice, the regulating device will be adjusted in combination with the spring 19 for control by the accelerator member 14, which adjustment will fix the force exerted by the spring either at a constant value proportional to the maximum torque of which the internal combustion engine is capable of developing in the case of constant opening of the throttle valve; or at values variable in dependence upon the position of the member 14 in accordance with an arbitrarily chosen law. In the first case, with constant throttle opening, the variation of speed of the group is obtained by the variation of the electric resisting torque or back E. M. F. of the generator consequent upon the displacement of the resistances 9 and 10; and in the latter case the variation is obtained by supplementing this action by the variation of developed torque of the internal combustion engine upon variation in throttle opening.

Moreover it is evident that the movement of the regulating member could be effected by any means other than a spring so long as it acts proportionally to the torque developed by the internal combustion engine, for instance by the displacement of a piston under the action of a pressure proportional to the mean pressure maintaining in the cylinders of the engine.

The driver could thus adjust at will the power output of the internal combustion engine 2 to the speed desired for the vehicle. The regulating device for its part would automatically adapt to this power output a minimum fuel supply of the engine so as to utilise completely the power capable of being developed in this condition of the engine. If too much fuel were supplied, speed would tend to increase, so that proper throttle setting could be quickly ascertained. Finally the system described will automatically transform the power supplied from a fixed throttle setting into either a small torque and high speed, or a high torque and low speed, according to the gradient of the track, by variation of current flowing in coil 6.

Similarly, whatever may be the characteristic of the driving torque of the internal combustion engine 2, the system described will automatically adapt the characteristic of the resisting torque of the generator, to that of the engine, from which results an operation of the engine 2 which involves a minimum of wear and of consumption of fuel, since the engine constantly operates in the neighbourhood of its maximum torque and efficiency.

SINGLE GENERATOR SUPPLYING REVERSIBLE MOTOR (Figs. 2a, 2b, 2c)

The first form of construction according to Figure 2 which employs the basic system of Figure 1, can be applied equally as well to the drive of a rail vehicle or a road vehicle; but the latter, however, requires the usual steering mechanism in addition to the mechanism about to be described.

The following parts comprised in the diagram of Figure 1 are designated in Figure 2 by the same references: the electric generator 1; the internal combustion engine 2; the electric motor 3; the members 4 driven by this motor; the circuit 5 connecting together the armatures of the generator and motor and passing through the coil 6 of the regulating device; the resistances 9 of the generator field rheostat and 10 of the motor field rheostat and the corresponding sliders 11 and 12; the armature winding 13 of the regulating device constructed as the armature of an electric motor, this winding likewise being connected to the field of the generator 1; the accelerator pedal 14 acting, as will be seen, on the throttle 16 regulating the fuel intake to the internal combustion engine 2, the arrow 17 showing the direction of movement of the pedal for acceleration; the spring 19 which is constructed to exert a torque on the moving part 20 constituting the armature of the regulating device; the rocker 23 intended to reverse the regulating action applied to slider 12 relative to that applied to the slider 11; and finally the switch 25, shown here as replaced by a single-pole double-throw switch, by means of which the armature of the motor 3 can be short-circuited through a braking resistance denoted by 26.

The generator 1 is provided with a separate exciter 27 and the motor 3 with a separate exciter 28, both mounted on an extension of the shaft of the engine 2, along with the generator 1. The excitation of these generators is derived in turn from batteries 29, 30, corresponding in general to batteries 7 and 8 of Figure 1, and having for example a terminal voltage of 12 volts each.

The generator 1 and the motor 3 are both in direct connection with their exciters, one by the circuit 31 passing through the winding 13 and the other by the circuit 32 to the armatures of exciters. Variations of generator and motor flux are obtained by varying the exciter fields, for which purpose these field circuits pass through the corresponding resistances 9 and 10 by means of the following circuits: for the exciter, 27, positive pole of the battery reversing switch 33, switch 34, leads 35 and 36 with the field of exciter 27 interposed, resistance 9 and lead 37 passing to the negative pole of the reversing switch 33 for the generator; and for the exciter 28, positive pole of the change-over switch 33, lead 38, contact 39, segment 40, contact 41, leads 42 and 37, resistance 10, leads 43 and 44, field of exciter 28, lead 45, contact 46, segment 47, contact 48, lead 49 and return to the negative pole by 37 as before.

The tracing of the two foregoing circuits is on the basis that the change-over switch 33 is connected to one of the batteries 29 and 30; that the switch 34 is closed and that the lever 50 of the direction-determining apparatus is displaced in the direction of the arrow 51. Should the lever 50 be displaced in a counter-clockwise direction, the field circuit of the exciter 27 for the generator will remain unchanged, while the field circuit of the exciter 28 for the motor will pass through the following circuit: positive pole of the change-over switch 33, lead 38, contact 52, segment 47, contact 53, lead 45, field of exciter 28, leads 44 and 43, resistance 10, lead 57 and 42, contact 41, segment 40, contact 54 and return to the negative pole by the leads 49 and 37.

As will be seen, the current does not pass through the exciter 28 in the same direction in both cases, it passing from the lead 44 to the lead 45 in the first case and from the lead 45 to the lead 44 in the latter. The reversal of the direction of the flux thus produced in the motor 3 makes it possible to reverse the direction of rotation of the motor simply by manipulating the lever 50. Moreover, in the rest position of lever 50 as shown the motor 3 is not excited, since the field circuit of its exciter 28 is open, not only because of the segment 40 of lever 50 is out of contact with the contacts 39, 41 and 54, but also because the segment 47 of the said lever is out of contact with the contacts 46, 48, 52 and 53.

It should be mentioned that the field circuit of the exciter 28 for the motor 3 is influenced not only by the resistance 10 but also by a second variable resistance 55 in parallel with the latter by means of the leads 56 and 57 connected to the leads 43 and 44. This second resistance acts during braking, being normally fully connected in circuit as shown by the rest position illustrated in Figure 2, so that current flow therethrough is effectively blocked during normal operation of the system. The braking action will be described later.

The system thus described operates in the following manner: The internal combustion engine 2 is started by operation of the generator 1 after the switch 33 has been closed on to one of the batteries 29 and 30 (to be described in the next paragraph) followed by the closing of the switch 34. This latter not only closes the field circuit of the exciter 27 for the generator but also feeds the ignition coil 58 for the internal combustion engine, without which the latter could not operate. Finally, the switch 34 has the third function of permanently opening the main supply circuit 5 to the motor 3 so long as the lever 50 of the direction-determining device is in its illustrated rest position, this being brought about by its closure of the following circuit: positive pole of the switch 33, switch 34, lead 35, electromagnet 59 for the double throw switch 25, lead 60, contact 61, segment 62, brush 63 and return to the negative pole of switch 33 by leads 49 and 37. The electromagnet 59 being thus energized, the armature of the double throw switch 25 is lifted to the braking position, and the circuit 5 is maintained open.

To start up the system, switches 33 and 34 are closed, following which the switch 64 is closed, the latter completing a starting circuit constituted by the positive pole of the two batteries 29 and 30 in series, the above-mentioned switch 64, the lead 65, a separate starting field winding on the generator, the lead 66, a shunt branch of the circuit 5 comprising the generator armature, and the lead 67, returning to the negative pole of the two batteries. The generator 1 then starts the internal combustion engine 2.

At the same time a circuit is set up, as a shunt on the starting circuit, starting from the lead 66, acting as positive pole, through the lead 68, the fan motor 69, the lead 70 and the winding 71 of the contactor 72, and back to the main starting circuit at 67, this shunt circuit closing said contactor 72.

With contactor 72 thus being closed, then when the switch 64 is opened, the following charging circuit for the batteries is set up: positive pole of the generator 1, leads 66 and 68, fan motor 69, lead 70, contactor 72, positive pole of the battery 29 in series with the battery 30, negative pole of the latter and return to the negative pole of the generator by the lead 67 and a shunt on the circuit 5. Thus the charging of the battery is effected from the generator through the fan motor of the internal combustion engine, which latter is thus cooled more strongly, upon increase of the output of the generator 1.

It nevertheless is apparent that the quantity of current diverted in this way is small in comparison with the load current to motor 3 supplied by the generator 1, rendering valid the statement that the motor absorbs practically all the current output of the generator.

Once the internal combustion engine is started, it can be accelerated by means of the pedal 14. Moreover, it will be seen that the field of the exciter 27 for the generator has been preliminarily energized as soon as the switch 34 is closed, which makes it possible for it to function immediately supplying field current for generator 1.

The energization of the motor 3 in a selected direction is then brought about by operating the lever 50 of the direction-determining device in the desired direction. When that is done, the segment 62 is first removed from the contacts 61 and 63 and thus the excitation current of the electromagnet 59 is cut causing the double pole switch 25 to fall into the position shown in the drawing, in which it closes the feed circuit 5 to the motor 3. Further movement of lever 50 results in the excitation of the exciter 28 for motor 3 in the direction chosen, the motor 3 in its turn being excited over circuit 32 and starting up in the direction determined by the above operation.

If now, the internal combustion engine 2 is accelerated by pedal 14, the following occurs: The movement of the accelerator pedal 14 in the direction of the arrow 17 causes an upward pull on the rod 73 and a pivoting of the bell crank lever 74, moving the rod 75 in the direction of the arrow 76. The resistance elements of the rheostats 9 and 10, and a cam 77, all mounted on rod 75, are bodily carried along with the rod 75. There results a simultaneous decrease in the values of the resistances inserted in the field circuits of the generator and motor exciters, and a raising of the rod 78, controlled by the cam 77, in a direction to open the throttle 16.

The internal combustion engine then accelerates, and the total power transformed in the system increases, partly as a result of simultaneous increase of speed of all the units participating in the power transformation, and partly as a result of the increase of excitation of the electrical units. In other words, the generator and the exciters, fast on the shaft of the prime mover, rotate faster and are more strongly excited, while the motor 3 likewise is more strongly excited.

Displacement of the accelerator pedal 14 also produces further effects. It raises a lever 79, pivoted at one end, which lever in turn raises both a cam 80 and a pivot 81 about which the lever or rocker 23 swings, in order to adapt the operation of the regulating device to the new running condition which has been arbitrarily imposed on the internal combustion engine by depressing pedal 14.

Due to the raising of the cam 80, acceleration of the engine 2 is accompanied by a change in the tension of the opposing spring 19 of the regulating device, since the roller 82 is pushed back to the right in the drawing by the surface 83 of the cam, in the direction imposed by the guiding rod 84. The spring 19 is also fixed to the moving part 20 by means of an elastic blade 85 forming part of the latter. Dampening means such as a dashpot comprising a cylinder 86 filled with oil and a piston 87 having a small hole 88 therein connects the moving part 20 to that end of a lever such as the rocker 89 which is opposite to that at which the spring 19 is attached, and the roller 82, as may be seen, occupies a point on this rocker located between the two extremities.

The elastic constant of the spring will be so chosen that the rate of change of the opposing force which it develops is constant whatever may be the position of the moving part of the regulating device over the whole range of regulation. The form adopted for the surface 83 of the cam 80 is such that in the example described, the torque of the regulating device will from the very start of acceleration be kept close to a value near the maximum torque developed by the internal combustion engine.

Of course, if desired it would be readily possible to cause a variation of the elastic constant of the spring 19 in accordance with any desired law, simply by combining the slopes of the cams 77 and 80 in desired suitable manner.

The elastic blade 85, the dashpot 86, 87, 88, and the rocker 89 constitute a governor, the object of which is to stabilize the regulation and to obviate any tendency to hunt on the part of the moving part of the regulator, while tending to maintain a constant value for the force of the spring 19.

Assume for example that a sudden variation of the opposing torque of the generator takes place as by a sudden variation of the tractive effort, by rough manipulation of the accelerator member, or by defective operation of the internal combustion engine due to faulty operation of one or more cylinders thereof. The moving part of the regulating device is then subjected to a sudden displacement, and, since the oil cannot pass instantaneously through the small hole 88 of the dashpot piston, the effect is the same as if there were a rigid connection between the rocker 89 and the moving part 20 so that the latter at first is carried bodily therewith. The compensating elastic blade 85 will bend, adding its bending force to that of the spring 19.

The effect is thus opposed to the cause, and there is control with stabilisation, i. e. the change is not too abrupt, but nevertheless a perceptible difference is produced between the normal torque of the regulating device and that created by disturbance.

However, the compensating blade 85 will slowly straighten itself at the end of the disturbed operation, the oil of the dashpot having had time to flow through and cause a displacement of the piston to the right, permitting rocker 89 to swing in a counter-clockwise direction, and thus eliminating the additional temporary stress on the elastic blade 85 and spring 19. The opposing torque of the regulating device tends to resume the value it had before the disturbance.

The opposing torque of the regulating device thus being determined mechanically, the regulating device will operate in the manner previously described with reference to Figure 1, under the influence of the electromagnetic or resisting torque, which latter, if it exceeds the mechanical torque, will cause the moving part constituted by the armature 13 to rotate in the direction of the arrow 90. The value of the resistance of the rheostat which participates in the excitation of the generator 1 having diminished due to the displacement of the resistance element in the course of acceleration, it will be seen that the effect of the regulating device is at this instant to increase the resistance by displacing the slider 11 towards the right in Figure 2, while the value of the resistance of the rheostat 10 will be subjected to a fresh diminution, since, as the arm 91 swings to the right, rocker 23 swings about pivot member 81, moving slider 12 to the left, in a direction opposite to that of the slider 11. This reversal of movement impressed on the rod 91 is due to the swinging of the rocker 23 about its pivot 81; and as this pivot point 81 is displaced upwardly in the manner already described upon acceleration of the engine 2 it will be seen that the value of the change in the resistance of the rheostat 10 will be increased for the same angular displacement of the moving part 20 of the regulating device upon increase in the output of the engine 2. As a practical matter it is necessary that the regulatory action must be increased in efficiency and sensitivity as the load on the system approaches its maximum permissible value.

Thus the speed regulation of the group is purely electrical and is effected by a balance of the mechanical torque introduced by the accelerator member, with the opposing or resisting torque of the generator through the intermediary of the regulating system.

The internal combustion engine operates at substantially constant torque or rather at maximum torque and minimum power demand for that torque.

It is clear that the operation of the system could be initiated equally as well by first swinging the lever 50 in the desired direction, then accelerating, as by the described method of first accelerating and only then swinging the lever 50.

When braking the motor 3, the braking pedal 92 is actuated by depressing it in the direction of the arrow 93. This action raises the rod 94 and swings the levers 95 and 96 to the right in Figure 2. By means of a sector 97, lever 95 immediately closes the circuit of the electromagnet 59, which is thus energized from the positive pole of the change-over switch 33 through the switch 34, the lead 35, electromagnet 59, the lead 60, the segment 97 and the return to the negative pole of the change-over switch. Main circuit 5 is thereby opened at switch 25 which is closed on shunt resistance 26, which tends to brake the motor 3, generator 1 being on open circuit.

The accelerator pedal 14 having returned to its position of rest, being released prior to braking at pedal 93, the resistances of the rheostats 9 and 10 are fully inserted in the field circuits of the exciters. The generator 1 and the motor 3 are subjected to minimum excitation, and the exciters E. M. F.'s are lowered because of the idling speed of the internal combustion engine.

Simultaneously with the actuation of the sector 97, the slider 98 of the rheostat 55, actuating by the lever 96, is moved to the right to a degree dependent upon the strength of the braking action which it is desired to impose, and this causes a reduction in the value of the resistance 55. Now, as this rheostat is inserted in parallel with the rheostat 10 in the field circuit of the exciter 28 for the motor 3, the excitation of the exciter increases, as it should do, in proportion to the braking, building up the resistance flux of the motor 3.

At the same time the lever 99 pivots so as to approach the lug 100, which it contacts shortly before the end of the travel of the brake pedal, at the termination of braking, and it carries the lug 100 and rod 78 with it, producing at the last instant a slight acceleration of the internal combustion engine intended to support the braking action. This movement of the rod 78 is made possible independently of any movement of the cam 77 by making the bottom of rod 78 tubular and by loosely fitting it over a thinner rod 101 to which the roller 102 is fixed.

During braking, the regulating device is out of action, due to restoration of spring 19 to its rest position, and to greatly diminished current flow through the circuit of coil 6. Nevertheless, it might have a tendency to move under the action of the electromagnetic torque produced by the braking current passing through the winding 6. Such a displacement, however, has no practical effect, since it only tends to move the slider 11 of the resistance 9 to the right, whereas the entire value of this resistance is already in circuit, and since there is only a very slight movement of the slider 12 along the resistance 10 to the left, cutting down the value of this resistance due to the low position of the pivot 81 along the length of the rocker 23.

Nevertheless it is preferable to provide a stop for the slider 11 on the rheostat 9 at the end of its travel at the end giving maximum value of resistance. During braking this stop will then prevent any movement of the movable part 20 under electrical torque from the rest position shown, and during operation the slider 11 cannot disengage the resistance element 9.

The use for the batteries 29 and 30 of a voltage of the order of 12 volts is to provide for the starting of the internal combustion engine on 24 volts, while all the other operations requiring changes of the characteristics of the control circuits, and in particular current breaks, are effected at 12 volts, i. e. by means of the most compact apparatus, subject to practically no wear.

In considering the example which has just been described, it will be seen that the described method of regulation has the ultimate object of regulating the torques of the generator and motor groups in accordance with a balance of the torque demand imposed on the vehicle by the road and of the torques developed by the prime movers constituting the initial source of energy.

Variations in the coupling of these torques, both motive and opposing, produce variations in speed of the generator and motor groups, and there is thus proper relation between cause and effect.

The torques developed by the electrical machines are proportional to a combination of the magnetic flux in and the current taken by the armature of the particular machine, the former being a direct function of the excitation and the latter a function of the difference between the resultant electromotive forces of the generator and motor and of the total resistance of the supply circuit. The electromotive forces are themselves proportional to the product of the magnetic field flux and the speed of rotation, and this speed of rotation depends on the torques, thus on the flux and the current strength. The speeds can be varied readily in the direction opposite to the flux, as by accelerating the engine 2, and it thus follows that a variation of excitation, though it always produces a variation of flux, does not necessarily produce a variation of electromotive force; and the regulated values are definitely always the magnetic fluxes and through them the current strengths.

My use of separate excitation chosen results is a considerable economy of energy, due to the fact that in series motors beyond magnetic saturation of their cores the armature currents produce losses in the field without additional flux. These losses are avoided by maintaining the field current at the value corresponding to saturation, as by decreasing ohmic resistance of field circuits, even if the armature current increases upon development of high torque.

MULTIPLE UNITS IN MOTOR AND/OR GENERATOR GROUPS

In the case in which several units are provided in one or other of the generator and motor groups, it is clear that the individual fluxes of each unit will be regulated, which causes the total or resultant current strength to vary. If at a given instant for any reason the variations of flux give rise to no variation of current, it is possible to have recourse to a change of the manner in which the various units are connected together, for instance under the influence of the single regulating device, which then acts simultaneously and directly on the magnetic fluxes and on the total or resultant strength of current.

Figure 3 of the drawings shows how such connections can be effected in the case of four motors so as to place them in series, series-parallel or parallel by means of two change-over switches which can be actuated by the regulating device.

The four motors are designated 103, 104, 105 and 106 and are excited in parallel by means of field leads 32, regardless of the manner in which their armatures may be connected together. Mechanically these motors are coupled up in such a direction that they will all drive at the same speed a common mechanical member such as a vehicle, i. e. they are positively coupled together. The heavy leads 5 constitute the circuit connecting the armatures of the motor group directly to the generator or to a generator group.

The position of the multi-pole change-over switches 107 and 108 shown corresponds to series connection of the armatures of the four motors, i. e. circuit may be traced from the lead 5 at the left hand side of the drawing, considered as positive pole: motor 103, lead 109, closed contact 110, lead 111, motor 105, lead 112, contacts 113 and 114 which are in parallel, lead 115, motor 104, lead 116, closed contact 117, lead 118, motor 106 and return to right hand lead 5.

On reversing the position of the change-over switch 107, for instance by means of an electromagnet 119, series-parallel connection is produced. In this case the two motors 103 and 105 are in parallel through the following circuits: left hand lead 5, motor 103, lead 109, closed contact 120 leading through 112 to the point 121 on one hand, and left hand lead 5, lead 122, closed contact 123, lead 111 and motor 105 connected to the same point 121 on the other hand. From this common point the circuit is completed by two parallel branches each comprising one of the motors 104 and 106, namely: from the junction point 121 through the contact 113 and the lead 115 to the motor 104 then by the lead 116, the closed contact 124 and the lead 125 to the right hand lead 5 on one hand, and from the point 121 through the contact 113 and the lead 115 to the closed contact 126, leading finally by the lead 118 to the motor 106 connected to the right hand conductor 5, on the other hand.

Finally, keeping the change-over switch 107 reversed, and reversing in its turn the change-over switch 108, for instance by means of the electromagnet 127, one passes to the connection of the four motors in parallel by the following four circuits: firstly from the left hand lead 5 by the motor 103, contact 120, lead 112, closed contact 128 and lead 125 to the right hand lead 5; secondly from the left hand lead 5 by the lead 122 to contact 123, lead 111, motor 105 then by the point 121 to contact 128, lead 125 to the right hand lead 5; thirdly from the left hand lead 5 by lead 122 to closed contact 129, then to lead 115 and motor 104 to terminate by the lead 116, contact 124, lead 125 and right hand lead 5; fourthly from the left hand lead 5 by the lead 122 to closed contact 129, then to lead 115 and contact 126, from there by lead 118 to motor 106 connected direct to right hand lead 5.

SINGLE GENERATOR SUPPLYING BANK OF FOUR (Figs. 4a, 4b, 4c)

The diagram of Figures 4a, 4b, 4c constitutes a modification of that of Figure 2 for the case of four motors 103, 104, 105 and 106 capable of being connected as has been described with reference to Figure 3.

The same reference numerals have been used for all the parts and connections corresponding to the same members or connections of Figures 2 and 3. For lack of room the accessory parts, such as the fan motor, starting and ignition members and battery-charging circuit breaker have been omitted. The battery 29 alone has been retained and is shown as connected direct to the circuits concerned, with the exception of the field circuit of the exciter 27 for the generator 1 and the exciting circuit of the electromagnet 59, which are placed under the control of the switch 34.

The rest position of the change-over switches 107 and 108 corresponds to the connection of the four motors in series, and starting will be effected in the manner already described with the four motors in series.

As soon as starting is effected it is possible to pass to series-parallel connection by closing the switch 130, thereby energizing the electromagnet 119 and causing the throwing over of the multipole change-over switch 107. It has been explained in the foregoing how the reversal of this single change-over switch connects the motors in series-parallel and there is no need to repeat the explanation. But it is clear that the operation and wiring of the electromagnet 119 could be rearranged so that on the contrary it would be energized for starting in series and thereafter be without current during normal running, during which the connections will then vary between the two alternatives of series-parallel and full parallel, according to the gradient of the track or the road in the case of a vehicle.

Passage from one to the other of these two latter methods of connection is controlled by the electromagnet 127, which the lead 131 connects to the positive pole of the battery. The other terminal of this electromagnet is then connected by the lead 132 to a contact 133 carried by the free end of the lever 74 directly actuated by the accelerator pedal 14. At the end of its travel, this contact meets a fixed segment 134 connected by a lead 135 to another fixed contact 136. It follows from this construction that the passage to parallel connection by energizing the electromagnet 127 is possible only if the contact 133 closed on the segment 134, i. e., if the engine 2 is fully accelerated. Still another condition must be fulfilled: that an electrical connection exists between the contact 136 and a contact 137 capable of closing the circuit of the electromagnet 127 to the negative lead 37.

Now, if the moving part 20 is shown in its illustrated position of rest, when there is no acceleration, and if its regulating movement is effected in the direction of the arrow 90, it is clear that at the limit of acceleration, the spring 19 being then fully extended, the moving part 20 will have a tendency, at least so far as concerns the opposing force, to swing in the direction opposite to the arrow 90. The pivot 81 of the rocker 23 being at that time raised very high in its guide, since the acceleration is at its maximum, the least backward movement of the moving part 20 under the influence of spring 19 will produce a large angular movement of the rocker 23 and permit the contact 137 carried by the slider 12 to reach the contact 136 and cause the motors to be shifted to parallel connection.

The complete starting operation of a vehicle equipped in accordance with the diagram of Figure 4 will thus comprise a first phase of starting with the motors in series, by simple actuation of the accelerator pedal 14 and swinging of the lever 50 of the direction-determining apparatus in accordance with the desired direction of running, then a second phase consisting of preventing the possibility of continued connection in series by closing the switch 130. From this instant the operations of changing connections become automatic, and the speed of the vehicle adapts itself to the resistance of the road so that it is sufficient to push acceleration to the limit of the throttle opening.

It will be seen that as soon as switch 130 is thrown, the starting series connection is shifted to series-parallel. If thereafter the torque imposed on the motors diminishes, and the difference between the driving torque and the electrical or resisting torque of the part 20 increases, and part 20 tends to return to its position of rest, or even to swing clockwise beyond its rest position and parallel connection is produced. Parallel connection will be terminated as soon as the equilibrium is disturbed, for instance by a change in the road or a rise in the track, and this produces a new oscillation of the part 20 in the direction of the arrow 90.

It is unnecessary to repeat the description relating to the braking, for which the change-over switch 25 connects the motors to the brake resistance 26, an operation previously described in connection with the diagram of Figure 2.

The change-over switches for the connections might be required to carry relatively high currents, and it would appear to be necessary to provide them with blow-outs. To avoid the necessity of adopting this safety measure, the current circulating between the generator and motor groups might be interrupted at the instant of changing over, as for instance by providing automatic instantaneous suppression of the excitation of the generator group each time a change-over takes place.

AUTOMATIC CHANGE-OVER OF MOTOR GROUP CONNECTIONS

As has been stated in the foregoing, it is also possible to provide for entirely automatic changing of connections, to avoid the necessity of actuating the change-over switch 107 by hand as by closure of switch 130. In this case the control of a rail vehicle could be limited to simply manipulating an accelerating member and a member determining the direction of running.

In Figure 5 it is shown how this automatic operation can be obtained, and in this figure only those elements necessary for understanding the following description are shown. Illustrated are the moving part 20 of the regulating device, a part of the lever 74 and of the rod 75, the lower end of the rod 94, and the lever 95, and the motors 103, 104, 105 and 106, together with the switches for changing over the connections. The change-over switch 108 operates in the manner already described under the action of the electro-magnet 127, while the operations of the change-over switch 107 are reversed relative to what is shown in Figures 3 and 4, in that series connection is effected when the electromagnet is energized, i. e. it is in the position shown, and not in its rest position.

The moving part 20 of the regulating device has attached to it an arm 138 carrying a contact 139 which is capable of meeting a fixed contact 140. The rod 75 carries and moves with it a contact 141, which normally closed on a fixed bar 142; for a portion of the travel of the rod 75, the contact 141 can slide along this bar 142 but this contact is broken when the accelerator pedal reaches a given position of its travel, causing a sufficient displacement of the rod 75 in the direction of the arrow 76. The lever 95 actuated by the brake pedal comprises in addition to the segment 97, two other segments 143 and 144, the segment 144 being connected to the negative pole of the battery, not shown. The contacts 139 and 141 are permanently connected together electrically, and the same is true of the contact 140 and the bar 142 connected to the negative pole of the battery. The segment 143 connects together two contacts 145 and 146 so long as the brake is not in action. Finally, the segment 144 contacts a contact 147 at the commencement of braking and closes on a contact 148 when the braking effect is at its maximum.

Starting is effected with the various members in their positions illustrated in Figure 5, the electromagnet 119 being energised and the electromagnet 127 being at rest, which corresponds to series connection of the motors. The excitation of the electromagnet 119 is effected by the circuit: positive pole, electromagnet 119, lead 149, contact 145, segment 143, contact 146, lead 150, contact 141, bar 142 and return to the negative pole.

As an incident for the movement of the accelerator pedal for accelerating the internal combustion engine, the rod 75 is moved in the direction of the arrow 76, and at a given instant the contact 141 breaks contact with the bar 142. The previously completed excitation circuit of the electromagnet 119 is broken and as the change-over switch 107 returns to its rest position a change is automatically made to series-parallel connection, switch 107 remaining in its inactive position until the system comes practically to rest. The automatic change to full parallel connection is then effected in the manner described in connection with Figure 4, i. e. when the electromagnet 127 is energised through the circuit: positive pole, lead 151, electromagnet 127, lead 132, contact 133 of the lever 74 and from there through the members already described in connection with Figure 4b, the full parallel circuit being completed only if acceleration is carried to the limit and if the moving part 20 of the regulating device is in its position of rest or has passed beyond it in a clockwise direction.

If now for any reason the equilibrium of the regulating device is disturbed to an extent causing the device to react to a sudden increase of the torque provided by the motor group causing a slowing of the R. P. M. of the motor group, the swing of its moving part 20 in the counter clockwise direction of the arrow 90 under the influence of increased current flow will first break the excitation current of the electromagnet 127, giving rise to a change of connection from parallel to series-parallel. This change may be followed by a return to series connection if the amplitude of the swing of the moving part is such that the contact 139 meets the contact 140, for at this instant the excitation circuit is restored via: positive pole, electromagnet 119, lead 149, contact 145, segment 143, contact 146, lead 150, contact 139, contact 140 and return to negative pole.

Braking operations likewise give rise to changes of the connections so arranged that the beginning or light braking action occurs with the motors still connected in parallel while the maximum braking action occurs with the motors connected in series. This full series connection has the effect of adding together the electromotive forces of the motors, and thus it gives rise to a greater braking effect at a given speed than does series-parallel or full parallel connection, making it possible to ensure sufficient braking even when the motor group is nearly stopped.

Thus, at the very start of the braking action the movement of the lever 95 in the direction of the arrow 152 opens the series-connection circuit passing through the segment 143. At the same time the electromagnet 127 is energised and puts the motors in parallel, for the segment 144 immediately reaches the contact 147, thus closing the following circuit: positive pole, lead 151, electromagnet 127, contact 147, segment 144, lead 37 and return to the negative pole.

Upon further movement of the brake rod 94, the two electromagnets 119 and 127 are both cut out of circuit, the former by the movement already mentioned of the segment 143, and the latter due to the fact that the central part of the segment 144 is incapable of closing any circuit through the contact 147. Accordingly, braking is effected while the motors are connected in series-parallel.

If the braking rod is moved to its full extent, it will be seen that finally the segment 144 again closes the circuit of the electromagnet 119, this time by means of the contact 148 connecting the lead 149 through the lead 37 to the negative pole. The connection of the motors then is full series.

The various connections can be applied not only to the armatures of the motors and generators, when there are several units in each of these groups, but it is also possible to vary at the same time the field connections of these various units.

SYSTEM OF FOUR MOTORS AND TWO GENERATORS
(Figs. 6a, 6b)

Figure 6 shows a general case of this kind applied to a system having two generators and four motors. The connections effected can conveniently be set forth in a table in the following manner.

I. For starting and high torques.
  (a) Armatures of the generator group connected in parallel.
  (b) Fields of the units of the generator group connected in series.
  (c) Units of the motor group connected in series.
  (d) Fields of the motor group connected in parallel.

II. For medium speeds and torques.
  (a) Armatures of the generator group connected in series.
  (b) Fields of the generator group connected in series.
  (c) Armatures of the motor group connected in series-parallel.
  (d) Fields of the motor group connected in parallel.

III. For high speeds and small torques.
  (a) Armatures of the generator group connected in series.
  (b) Fields of the generator group connected in parallel.
  (c) Armatures of the motor group connected in parallel.
  (d) Fields of the motor group connected in series.

The reference numerals used previously have been applied again in this figure to all the members already described in the previous diagrams, and the drawing has been simplified in that it shows only what is useful and necessary for understanding the operations of changing over the connections, as was the case in the description of Figure 5.

The motors 103, 104, 105 and 106, the armatures of which are fed through two change-over switches 107 and 108, here receive their energy from two generators 153 and 154, which can be placed at will in series or parallel by means of a change-over switch 155. In the illustrated position of this change-over switch, corresponding to energisation of its electromagnet 156, the two generators are connected in parallel on the circuit 5; the latter is shown as broken off towards the top of the figure where it is intended to pass through one of the windings 6 (not shown) of the regulating device. In its rest position the electromagnet 156 consequently connects the two generators in series.

As regards the field circuits, these are fed by the exciter 27 for the generators and by the exciter 28 for the motors, but with circuits passing through change-over switches 157 and 158 respectively.

The change-over switch 157 for the generator fields, controlled by the electromagnet 159, is capable of placing the field windings of the generators in series or in parallel. In the illustrated position of the change-over switch, these windings are in series, a connection which corresponds to the rest position of the electromagnet 159.

The change-over switch 158 is controlled by the electromagnet 160 and likewise makes it possible to put the fields of the motors in series or in parallel, the position shown effecting parallel connection and corresponding to the rest position of the electromagnet 160.

It is clearly evident from the diagram that the electromagnets 119 and 156 are in parallel through the leads 151 and 161, and that similarly the electromagnets 127, 159 and 160 are in parallel by means of the leads 162 and 163 in the case of the two latter and 151 and 163 for the first, the leads 151 and 162 constituting in effect the common positive pole for all the electromagnets referred to.

The negative pole of the supply source for the electromagnets is connected by the lead 164 to the contact 140 and the bar 142, and by the leads 164 and 37 to the contact 137 and the segment 144.

The described arrangement operates in the following manner: The various members are shown in the starting position. In this position it will be seen that the electromagnets 119 and 156 are energised, while the electromagnets 127, 159 and 160 are interrupted at 134. The excitation of the two first mentioned electromagnets takes place from the positive pole through the two electromagnets in parallel, then by the lead 161, contact 145, segment 143, contact 146, lead 150, contact 141, bar 142, with return to the negative pole by the lead 164.

The positions shown fully correspond with the arrangements provided for starting and for obtaining high torques, i. e. the armatures of the generator group are in parallel, giving rise to high current development, and the fields of the motor group are in parallel, giving rise to low back E. M. F.'s, while the armature of the motor group and the fields of the generator group are in series. The depression of the accelerator pedal previously described in connection with the other figures of the drawing gives rise, as is known, to a sliding of the rod 75 in the direction of the arrow 76. At a certain predetermined instant the contact 141 breaks contact with the bar 142, and the supply circuit which has been described for the electromagnets 119 and 156 is opened. Due to the opening of this circuit the electromagnets 119 and 156 become deenergised and the position of the change-over switches 107 and 155 is reversed; the change of position of the switch 107 results in placing the armatures of the motor group in series-parallel, and the change in position of the switch 155 causes the armature of the generator group to be placed in series. The field connections of the two groups have however undergone no modification, and the system is then connected as in table II indicated hereinbefore as corresponding to medium speeds and torques.

When the acceleration reaches a maximum value and the motors attain a high speed, developing small torques, the connections are those described with reference to Figure 4, where the contact 133 meets the segment 134, while the contact 137 meets the contact 136. As a result the following circuit is closed: positive pole, electromagnets 127, 159 and 160, all three connected to said positive pole, lead 163 which likewise is connected to these three electromagnets, lead 132, contact 133, segment 134, lead 135, contact 136, contact 137, leads 37 and 164, and return to the negative pole. Thus the three changeover switches 108, 157 and 158 are reversed in position. The result of this reversal is to connect the four motors in parallel and to put the fields of the two generators likewise in parallel and finally to put the fields of the four motors in series. This latter connection admirably fulfills the conditions previously fixed under Table III for high speeds and small torques, for in the meantime no change has taken place in the position of the change-over switches 107 and 155, the electromagnets of which still have their circuits open.

If, now, in consequence of a sudden mechanical resistance met with the units of the motor group the moving part 20 of the regulating device is displaced, no matter how little, in the direction of the arrow 90, the contacts 136 and 137 separate, and due to this a break occurs in the feed circuit to the three electromagnets 127, 159 and 160. The change-over switches for the field connections are reversed, the connections of the motors change from parallel to series-parallel and the case envisaged under Table II arises.

If the resistance encountered by the motor units is large enough for the displacement of the moving part 20 through a distance sufficient to bring the contacts 139 and 140 together, the additional effect will be produced of closing the circuit of the electromagnets 119 and 156 and thus of reversing the position of the change-over switches 107 and 155, i. e. on one hand the series connection of the armatures in the motor group is brought about and on the other hand the parallel connection of the units of the generator group is accomplished, which is the case envisaged under Table I giving rise to high torques and which is of more important use in the course of starting.

The changes of connection which have just been described are produced not only by variations during operation but also under the influence of braking as described in the following:

Whatever connections may be in operation at the moment it will be seen that the movement of the rod 94 due to actuation of the brake pedal (not shown) causes the movement of segment 143 in the direction of the arrow 182 and electrical separation from each other of the contacts 145 and 146 included in the feed circuit of the electromagnets 119 and 156. From the very start of any braking operation therefore, the energization of these two electromagnets of necessity is interrupted. By consequence switches 155 and 107 are removed from the positions shown, and the generators 153, 154 are connected in series, and the motors in series-parallel. When the braking action is started the segment 144 closes on the contact 147, and due to this closure closes the circuit of the electromagnet 127, which is then energised in common with the electromagnets 159 and 160 via: positive pole, leads 151 and 162 in parallel, electromagnets 127, 159 and 160 in parallel, lead 163, contact 147, segment 144 and return to the negative pole by leads 37 and 164. Thus the position of the changeover switches 108, 157 and 158 is caused to be the opposite of that shown, and the commencement of braking is effected on the motors connected in parallel with their fields in series, the generators having their fields in parallel. The connection of the generators or of their fields, however, is a matter of no moment during the braking operation, since the effect of movement of the segment 97, as has been seen in the description of Figures 2c and 4c, is to reverse the position of the change-over switch 25 and thus to put the motors into circuit with the brake resistance 26, cutting out all intervention of the generator group. No further reference will therefore be made to what is happening in the latter.

On increasing the throw of the brake pedal, the feed circuit of the electromagnets 127 and 160 is opened by consequence of the shape of the central part of the segment 144; and the corresponding change-over switches 108, and 158 resume the position of the drawing, so that the motors are placed in series-parallel with their fields in parallel.

Finally, when the braking is pushed at a maximum, the segment 144 contacts with the contact 148 and closes the circuit of the electromagnet 119 via: the positive pole, lead 151, the electromagnet 119, lead 161, contact 148, segment 144, and return to the negative pole by the leads 37 and 164. The four motors are thus placed in series by the reversal of the change-over switch 107.

It is clear that the number of units in the generator and/or motor groups can be different from those chosen in the examples described, and that by consequence other combinations of connections can be obtained.

SYSTEM OF ANY NUMBER OF GENERATORS AND HAVING TWO MOTORS
(Figs. 7a, 7b, 7c)

Such is the case in the system according to Figures 7a, 7b, and 7c in which there are two motors 165 and 166.

It will be assumed that the motor 165, on the left side of the diagram, drives the transmission on the left side of the vehicle, while the motor 166, on the right of the diagram, drives the transmission on the right side.

There are two direction-determining devices, one 50 for the motor 166 on the right side, the other 50' for the motor 165 on the left side, and likewise two exciters for the motors. The exciters are designated by the reference numerals 28 and 28' and each comprises its regulating resistances 18, 55, 18', 55' respectively.

In addition to the determination of the rotating direction of rotation of the motors, which will be assumed in direct or running forward when the levers 50 and 50' are displaced in the direction of the arrows 51 and 51', and reverse or running backward in the opposite case, the direction-determining devices make it possible to act on the torques developed by these motors; for in addition to the above-mentioned resistances, the exciting current of the exciters 28 and 28' passes, as will be seen, through the regulating resistances 167 and 167' of the direction-determining devices.

Details of the diagram will be understood in the course of the following description from the enumeration of all the operations required to drive the vehicle.

The starting of the engine 2 (not shown) of the system is effected in the manner already described, i. e. the batteries 29 and 30 or a part thereof are closed on the control circuits, an operation which has already been effected on this diagram, and a switch for the ignition is closed as well as a starting contactor to start the combustion engine by means of the generator. These operations also cause the energization of the electromagnet 59 by the circuit: positive pole of the battery, one of the leads 36, lead 35, electromagnet 59, lead 60, contact 61, a segment 62 of the direction-determining device 50, lead 168, contact 61', a segment 62' of the direction-determining device 50', leads 49' and 37, then return to the negative pole. At the same time, a weak exciting current is sent in the field circuit of the exciter 27 for the generator by the positive pole, the field circuit of said generator, one of the leads 36, the resistance 9 entirely interposed, the lead 37 and return to the negative pole. Thus, the excitation of the exciter being established beforehand, the armature circuits of the motors are entirely disconnected from the armature circuits of the generator, and this makes it possible for example to accelerate the engine while the control devices 50, 50' are at rest, in order to test it.

To set the vehicle into operation in a straight line, it is then necessary only to manipulate the two levers 50 and 50' simultaneously in the direction of the arrows 51 and 51' and to depress the accelerator pedal (not shown). The energizing circuit of the electromagnet 59, passing through the sectors 62, 62' of the direction-determining devices, which now have moved from their rest position, is immediately opened, and the switch 25 returns to the illustrated rest position, in which the rotors of the motors are connected through circuits to the rotor of the generator (not shown). This circuit includes therein change-over switch 169, the function of which will appear hereinafter.

On the other hand, the simultaneous displacement of the two direction-determining devices causes at the end of their motion, the excitation of the exciters of the motors by the following circuit:

For the exciter 28: from the positive pole of the battery by one of the leads 36, the lead 38, the contact 39, the sector 40, half of the resistance 167, the lead 170, the sector 171 of the lever 95, the leads 172 and 57, the resistance 10, the lead 44, the field winding 173 from left to right, the lead 45, the sector 174, the lead 175, the sector 47, the leads 49 and 37 and return to the negative pole. The resistance 10 is the one placed under the control of the acceleration and of the regulating device, and it is connected in parallel with the resistance 55 which is dependent on the manipulation of the brake pedal (not shown), the parallel connections being effected by the leads 43 and 57.

The excitation of the exciter 28' is effected by the following similar circuit: positive pole, a lead 36, lead 38, contact 39', sector 40, half of the resistance 167', lead 176, sector 177, leads 178 and 51', resistance 10', lead 44', field winding 173' from left to right, lead 45', sector 179, lead 180, sector 47', leads 49', 37, and return to the negative pole. The resistance 10' is under the control of the accelerator pedal and of the regulating device, and a resistance 55' is connected in parallel to it, which is dependent on the manipulation of the brake pedal, the parallel connection being effected by leads 43' and 57'.

As will be seen the two exciters 28, 28' are excited in the same direction, from left to right, and it will be assumed by definition that the latter corresponds to the direct or forward running of the vehicle driven by the two motors 165, 166, the halves of the resistances 167 and 167', which are inserted in each of the circuits, making it possible to regulate said fields in such manner that the two motors cause the vehicle to advance in a straight line.

The illustrated or rest position of the change-over switch 169 corresponds to the coupling of the two motors in series.

By depressing the accelerator pedal, the throttle valve is caused to open, the torque of the combustion engine increases and so does its speed. The excitation of the exciter of the generator increases and so does the excitation of the exciters of the motors, due both to the increase in power of the generator group and to the decrease value of the resistances 9, 10 and 10' which are moved with the rod 75 in the direction of the arrow 76. The vehicle thus is accelerated.

By pushing the levers 50 and 50' as far in the direction of the arrows as possible, direct running at great speed is reached by throwing the two motors into parallel, an operation accomplished by reversing the change-over switch 169, this being done by the energization of the following circuit: positive pole, a lead 36, lead 35, electromagnet 181 of the switch, lead 182, sector 183 of the direction-determining apparatus 50, putting the above-mentioned head into communication with a lead 184, sector 183' of the direction-determining device 50', lead 132, contact 133, sector 134, lead 135, contact 136, contact 137, leads 185 and 37, then back to the negative pole. This circuit can of course be closed only if the contact 133 closes on the sector 134, and the contact 137 closes on the contacts 136, i. e. if the acceleration is increased to the maximum, the regulator being swung from the position of rest. As soon as the vehicle encounters any resistance to its progress, the displacement of the moving part of the regulating device under the action of coils 16, 6 (not shown) produces the separation of the contact 137 from the contact 136 whereupon the circuit of electromagnet 181 is opened, and the armatures of motors 165, 166 are automatically restored to series connection.

Operation of the vehicle in a straight line in the opposite or reverse direction is obtained by manipulating the levers 50 and 50' in the direction opposite to that indicated by the arrows 51, 51', setting up circuits similar to the preceding, but with change of the direction of the current in the field windings 173 and 173'. This reversal is effected by the sectors 47 and 47' of levers 50, 50'. Only the reversed field flux circuit of the exciter 28 will be described by way of example. This circuit may be traced from the positive pole, one of the leads 36, the lead 38, the sector 47, the lead 175, the sector 174, the lead 45, the winding 173 traversed this time from right to left, the lead 44, the resistances 10 and 55 put in parallel by the leads 43 and 57, the lead 172, the sector 171, the lead 170, one of the resistances 167, the sector 40, the contact 54 and return to the negative pole by the lead 37. A similar circuit can be traced for the exciter 28'.

As will be seen, in this case no contacts are provided for energizing the electromagnet 181 to throw the motors 165, 166 by means of the sectors 183 and 183' upon full throw of levers 50, 50' for it may be assumed that the reverse running will always be at a comparatively slow rate. The motor coupling is thus maintained in series, but it is clear that it is also possible to provide for such parallel positioning at the extreme limit positions of the levers 50 and 50', in full acceleration position, the regulating device being moved out of its rest position.

Passage of the vehicle around curves is obtained by setting up a difference in the power transmitted to the two motors, each of which drives one side of the vehicle. It is clear that the degree of turning action obtained can be varied by causing the two motors to work either in the same direction, but with one operating at a higher torque, or with one of the motors stopped or running in the opposite direction. In other words, the driving of the vehicle will be effected exactly in the same way as that of a row boat, which is steered by pulling more strongly with one of the two oars or even at times by effecting inverse movements with the two oars.

The operations necessary for turning are very easy to execute by means of the levers 50 and 50' of the two direction-determining devices, since each of them makes it possible to proportion exactly the energy sent to each motor and the direction in which this energy acts.

Thus to turn to the right on the level in series-connection, it is necessary only to bring the lever of the direction-determining device 50 back in a counter-clockwise direction to a degree determined by the radius of the curve desired, while maintaining the lever of the direction-determining device 50' pushed forward, to a desired extent in the direction of the arrow 51'.

By effecting this operation, the portion of resistance 167 inserted in the field circuit of the exciter 28 will be increased so that the latter is less excited than the exciter 28', accordingly since the flux in the stator of the motor 165 on the left side remains the same, and since the flux in the stator of the motor 166 on the right side will diminish the greater portion of the energy output of the generator will be conducted to the motor 165 on the left side while only a small amount of energy will go to motor 166 on the right side.

By bringing the lever 50 back still further, to its center position shown, it will be seen that the motor on the right side absorbs no power because of the break of exciter circuit for winding 173 at segments 46, 47 and that all the power from the generator is available to the motor on the left side. The radius of the turning curve will be diminished; and it is possible to diminish it still more by rocking the lever 50 back in a counter-clockwise direction contrary to that shown by the arrow 51, so as to put the motor 166 on the right side in reverse. If the levers 50 and 50' occupy their extreme inverse positions described, the total power of the generator will be divided in equal parts, but with a reverse action between the two motors, and the vehicle will revolve sharply towards the right.

The manner of turning the vehicle to the left can be easily traced from the foregoing, the reactions of the vehicle being moreover so sensitive that the driver having his hands on the levers 50 and 50' is able to rectify at once the errors and excesses he may commit in either direction, since he has full control of the vehicle.

If, in the course of the operations and although having accelerated to the maximum, the motors are called upon for tractive effort in excess of the energy available, the coupling of the motors will immediately adapt itself to this effort.

As has already been seen, the motors are normally coupled in series, and are put in parallel automatically in certain conditions, making it possible to realize high speeds with reduced torques; but they are also restored automatically in series when the tractive effort required exceeds certain limits. Thus, at this moment, increased flow in windings 8, 16 causes arm 20 to swing counter-clockwise so that the contacts 136, 137 are separated. The supply circuit for the electromagnet 181 thus being deenergized, switch 169 resumes its rest position and the motors 165, 166 are restored to rest or series connection.

It is to be noted from the foregoing that simply by manipulating the levers 50 and 51, it is possible to cause the vehicle to follow an uninterrupted series of turnings in any desired direction, as for example, alternating from left to right; and a zigzag course can be followed, or the vehicle made to revolve.

When the vehicle undergoes braking the following sequence of operations occur:

When running in a straight line, either in forward or in reverse, the first reaction in braking is to operate the brake pedal, and this as is known causes the rod 94 to rise in the direction of the arrow 186; and also causes a simultaneous counter-clockwise oscillation of the levers 95 and 96 relative to the diagram. Moreover, it is well understood that any desired locking system may be employed, establishing such a connection between the brake and accelerator pedals (not shown) that it is possible to brake only after having first released the accelerator.

As soon as the lever 95 is moved, the sector 97 engages the contact 187 and closes the energizing circuit of the electromagnet 59 via: positive pole, one of the leads 36, lead 35, electromagnet 59, lead 60, contact 187, sector 97, lead 37, and return to the negative pole. In other words, the motors are immediately separated from the generator and shorted on the brake resistance 26. Assume that the braking is to be effected when the vehicle is moving forward, the levers of the direction-determining devices 50 and 50' consequently being displaced in the direction of the arrows 51 and 51'. It will be seen that in this case the sector 177 of the lever 95 closes the following circuit: positive pole, one of the leads 36, lead 38, contact 39', sector 40', part of the resistance 167' which is inserted at this moment, lead 178, sector 177, contact 188, leads 189 and 172, resistances 55 and 10 in parallel by means of the leads 57 and 43, lead 44, field winding 173 of the exciter 28 from left to right, lead 45, contact 190, sector 179, lead 180, sector 47', leads 49' and 37, then return to the negative pole. The excitation of the exciter 28 of the right hand motor will therefore be dependent not only on the combined value of the resistances 10 and 55, but also on that portion of the resistance 167' of the left hand direction-determining device 50' which is then inserted in the circuit. A similar circuit for the field winding 173' of exciter 28' for the left-hand motor 165 may readily be traced, including the right-hand direction-determining device 50. The establishment of circuits would be exactly the same in the case of braking while running in reverse, with the exception that the reverse position of the sectors 47 and 47' results in reversing the direction of the exciting currents for the exciters 28 and 28', all as may be readily traced on the diagram.

On the other hand, due to the reversal of the controls caused by the displacement of lever 95, whereby control lever 50' controls exciter 28, and control lever 50 controls exciter 28', the braking effects can likewise be effected while the vehicle is turning, so that the vehicle can be slowed down regardless of the radius about which it is turning.

Assuming such a braking of the vehicle to have been effected previously when the vehicle was running on a tangent, it will be seen for example that by bringing the lever 50 of the right hand direction-determining device back to its rest position, the excitation of the exciter 28' will be diminished because of increase in the value of resistance 167, and finally discontinued entirely due to separation at sector 47, and consequently, the resisting torque of the left hand motor 165 will be decreased and finally eliminated, and this will make the vehicle turn towards the right. By bringing said lever 50 beyond its central position, the magnetic flux in the winding 173' is reversed, tending to turn the armature of motor 165 in the opposite direction and according to the rate of travel of the vehicle, said reversal flux will have the effect either of accentuating the turn by causing the left hand motor 165 to run as a motor in the opposite direction, when the electromotive force developed by the right hand motor 166 exceeds that of the first motor mentioned, or if the rate of progress is too great for the reversal of field flux to reverse the direction of armature rotation, it will build up the armature reaction, and will slow up the speed of armature rotation, thus varying the turning action. The driver will instinctively limit the displacement of the right hand lever 50 and will instantly correct the position of this lever without complication if he does not obtain the result desired.

It is clear that a similar operation can be executed with the lever 50' of the left hand direction-determining device, if it is desired to turn to the left when braking, and that similar operations can be effected in order to turn either to one side or to the other when in reverse.

The system described and applied to a vehicle makes it possible to carry out very easily certain operations on very steep grades, either ascending or descending. If, for example, both levers 50 and 50' are pushed forward to the end of their motion, cutting out substantially all resistance 167, 167', and the acceleration reaches a maximum; then in order to go up a steep slope, the vehicle moving forward in a straight line, it is necessary only to release the accelerator pedal slightly back in order to hold the vehicle stationary on the slope, the driving and resisting torques just balancing, or to release said pedal still more, if it is desired to slip the vehicle backwardly at any desired speed under gravity action. Then by accelerating again the vehicle will readily start its forward movement anew. Somewhat similar control operations can be employed when the vehicle is descending a slope. In this case it is the brake pedal which is depressed to a desired extent in order to obtain all desired descending speeds. After the vehicle has been brought to an actual stop it is very easy to move back up the slope in reverse, simply by throwing the levers 50 and 50' in the opposite direction and by depressing the accelerator pedal to the desired extent.

FOUR MOTORS, MECHANICALLY INTERCONNECTED IN TWO'S
(Figs. 8a, 8b, 8c)

Finally, the system according to the diagram of Figures 8a, 8b, 8c comprises four motors 191, 192, 193, 194 connected mechanically two by two, as has been shown diagrammatically by the dot and dash lines 195 and 196, the two change-over switches 107 and 108 controlled by the electromagnets 119 and 127 making it possible to put these four motors in series, in parallel or again in series-parallel, it being understood that in such case the motors 191 and 192 in parallel are put in series with the motors 193 and 194 which are likewise in parallel.

The two pairs of motors just mentioned constitute two sub-groups and it will be assumed that the motors 191 and 192 situated on the left side in the diagram control the driving on the left side of the vehicle, while the motors 193 and 194 situated on the right side in the diagram will control the drive on the right side.

As in the preceding embodiment, there are two direction-determining devices 50 and 50' for the right hand and left hand motors, respectively, and an exciter in each sub-group, said exciters being designated by the numerals 28 and 28' with their field windings 173 and 173'.

The system according to this second embodiment operates more or less in the same way as that just described, so that it is unnecessary to describe its operation in detail, except that part relating to the coupling of the motor sub-groups, which will be described more particularly.

As will be seen, the rest position shown of the change-over switches 107 and 108 corresponds to the coupling of the four motors in series parallel.

By accelerating the vehicle while the latter is running in forward direction, which corresponds to a displacement of the rod 75 in the direction of the arrow 76 and to a displacement to the limit position of the levers 50 and 50' in the direction of the arrows 51 and 51', high speed in the said forward direction is reached by putting the four motors in parallel. This operation is effected by reversing the change-over switch 108, which is caused by feeding the following circuit: positive pole, a lead 36, lead 35, lead 197, electromagnet 127 of the switch, lead 198, sector 183 of the direction-determining device 50 putting said lead in communication with the lead 184 leading to the sector 183' of the direction-determining device 50', lead 132, contact 133, sector 134, lead 135, contact 136, contact 137, leads 185 and 37 then return to the negative pole. This circuit can, of course, be closed only if the contact 133 closes on the sector 134 and the contact 137 on the contact 136, i. e. if the throttle-opening is at a maximum, the regulating device having passed beyond its position of rest. As soon as the vehicle meets with any resistance, the displacement of the moving part of the regulating device causes the separation of the contact 137 from the contact 136 and the opening of the above-mentioned circuit, i. e. series-parallel coupling is resumed automatically.

As in the preceding embodiment, no circuit is provided for this electromagnet 127 for throwing the motors into the high-speed or parallel connection when the vehicle is running in reverse, for it can safely be assumed that this latter operation will never be at a high speed, but it is clear that if desired, modifications could readily be arranged for placing the motors in parallel at the extreme position of the levers 50 and 50', the accelerator pedal being fully depressed and the regulating device 20 having already passed beyond its rest position.

As has been seen already, the motors are normally coupled in series-parallel, and are automatically coupled in parallel under certain conditions, making it possible to obtain high speeds at a reduced torque. These motors are likewise automatically put into series when the load demand exceeds certain limits.

When the load demand increases, the driver reacts spontaneously by trying to accelerate to the maximum, since the vehicle begins losing speed, and this action results in closing the contact 141 on the contact 142. No action results from this closure until the electromagnetic torque on the control lever 20 has caused this latter to move a sufficient distance to the right in Figure 8a. However, as soon as the throw of this lever is sufficient, it closes the contact 139 on the contact 140 and thereby closes the following circuit: positive pole, one of the leads 36, the lead 35, the lead 197, the electromagnet 119 of the change-over switch 107, the lead 199, the contact 141, the contact 142, the contact 139, the contact 140, the lead 49', and return to the negative pole by the lead 37. The change in position of the change-over switch 107 which results puts the motors immediately into series, the change-over switch 108 then occupying the position of rest shown, since the exciting circuit of the electromagnet 127 passing through the contact 136 and the contact 137 cannot be closed in the above-mentioned position of the moving part of the regulating device in which the slider 12 is moved to the left.

This change to series operation can be effected regardless of direction of operation; e. g. forward or reverse motion, in a tangent or on curves.

As the turning often requires a considerable tractive effort, it may be useful at such times to throw the units of the motor group into series. This operation is easily effected by adding to the direction-determining apparatuses 50 and 50', additional sectors and contacts so arranged that in the extreme limit positions of the levers of said two devices, in either direction of motion, the electromagnet 119 is always energized, and due to this, a reversal of the change-over switch 107 is brought about, into the series-connection position.

It has already been explained that it is preferable to end the braking operation, i. e. to cause the maximum braking effect, while the motors are coupled in series. This coupling may preferably be effected automatically, for by depressing the brake pedal to the maximum, the sector 97 of the lever 95 is brought into contact with the contact 200 which closes the following circuit: positive pole, a lead 36, lead 35, electromagnet 119, lead 201, contact 200, sector 97, and return to the negative pole by the lead 37. The electromagnet 119, now energized, reverses the change-over switch 107 and thereby puts the motors into series.

It will be seen that in addition to the advantages resident in a system according to Figures 1–6, a system according to either Figure 7 or Figure 8 makes it possible to distribute judiciously the available power between several motor units or several sub-groups of motor units, and particularly to two sub-groups actuating a vehicle in the manner described thereby making it possible to obtain any desired one of the following power combinations.

1. Operation with reduced power of one of the sub-groups with transfer of the additional energy thus made available to the other sub-group, and this makes it possible, if desired, to supply all the energy of the power source to a single sub-group.

2. The progressive electric braking effect without any resistance of one of the sub-groups, while the other sub-group continues to absorb the power developed by the thermo-electric group or power source and the active force of the vehicle for the purpose of braking.

3. The reversal in direction of rotation of one of said sub-groups and the progressive regulation of the power absorbed thereby until full normal power is applied in a direction opposite to the original direction, while maintaining the movement of the other sub-group in the original direction.

4. Finally, any desired turning and/or braking effects, without the possibility of executing any faulty operation, both in this case and in the three preceding cases, or in all possible combinations.

In order to limit the number of control members which are necessary for carrying out the operations just described, the two direction-determining devices could for example be connected to a steering wheel with a movable shaft similar to the aviators "joystick" the rotation of said steering lever combined with its displacement in space then being all that is necessarily possible to drive the entire vehicle.

As may be seen a system according to the present invention makes it possible for instance to control a vehicle by the use of extremely moderate currents. As has been indicated in the description of the typical diagram of Figure 1, the driver will adapt at will the power of the heat engine or other initial source of mechanical energy to the desired speed of the vehicle, while the running conditions of this engine will automatically adapt themselves to this power, so as to utilize, regardless of the instantaneous conditions, the entire power developed under such conditions by the engine, and so that the power so devoloped is automatically transformed into either a low torque and high speed or a high torque and low speed, according to the gradient or resistance of the road or track. Moreover, it can be seen that the characteristic of the resisting couple of the generator adapts itself automatically to the torque characteristic of the prime mover regardless of the form of this latter characteristic, the prime mover having its wear and its consumption of fuel reduced to a minimum, since it is running continuously in the neighbourhood of its maximum efficiency.

Finally, it is clear that the means utilized and described above for carrying into practice an equipment possessing the claimed characteristics are not in any case to be regarded as limitative, either as to the type of initial energy source used; the mechanical and electro-mechanical arrangements considered; the method of braking, which could be regenerative, the type of auxiliary sources of current, which might have voltages other than those indicated and be constituted by equipment other than storage batteries or as regards the use made of the system, which could be adapted to fulfill purposes other than the driving of a vehicle.

What I claim is:

1. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits having controls therein for separately exciting said groups, said control device being connected with the controls of the exciter circuits for varying the fluxes in the exciter, upon variation of energy supply to the prime mover, a regulating member also connected with the controls of said exciter circuits and having a moving part so connected to the control device as to be biased thereby in one direction to an extent dependent upon the position of said control device, and electrical means connected so as to respond to generator currents, cooperating with said moving part of the regulating member, to resist said biasing action in proportion to the resisting torque of the generator group, and to reduce the field intensity in the electric motor group and increase that of the electric motor group whenever the electromagnetic resisting torque on the movable part exceeds the biasing action of the control device.

2. Apparatus for the transformation of energy, comprising a primary source of mechanical energy, means for varying the energy supply thereto, a control device for said means, an electrical generator group driven by said primary source, an electric motor group driven by said generator group, said motor group having driven means driven thereby, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part, elastic means connecting said regulating member with said control device and biasing said moving part in one direction of its movement to an extent dependent upon the degree to which the control device has opened the energy supply to the primary source, a main electrical circuit between the armatures of said generator and motor group, and means whereby the circuit for exciting the generator group, and said electrical circuit cooperate to produce a resisting torque in the said moving part, to resist said biasing action in proportion to the resisting torque of the generator group, and to reduce the field intensity in the generator group and increase that of the electric motor group, whenever the electromagnetic resisting torque on the movable part exceeds the biasing action of the control device.

3. Apparatus for the transformation of energy, comprising a primary source of mechanical energy, means for varying the energy supply thereto, a control device for said means, an electrical generator group driven by said primary source, an electric motor group driven by said generator group, said motor group having driven means driven thereby, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part, elastic means connecting said regulating member with said control device and biasing said moving part in one direction of its movement to an extent dependent upon the degree to which the control device has opened the energy supply to the primary source, a main electrical circuit between the armatures of said generator and motor group, and means whereby the circuit for exciting the generator group, and said electrical circuit cooperate to produce a resisting torque in said moving part, to resist said biasing action in proportion to the resisting torque of the generator group, and to reduce the field intensity in the generator group and increase that of the electric motor group, whenever the electromagnetic resisting torque on the movable part exceeds the biasing action of the control device, and dampening means connected to both said moving part and said elastic means, for dampening said elastic means, particularly when sudden changes occur in said resisting torque.

4. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits having controls therein for separately exciting said groups, said control device being connected with the controls of the exciter circuits for varying the fluxes in the exciters upon variation of energy supply to the primary source, a regulating member also connected with the controls of said exciter circuits and having a moving part, elastic means connecting with said moving part, means connected with and functioning as an incident to movement of said control device, and contacting and varying the tension of said elastic means according to any preselected law, the said elastic means biasing said moving part in one direction, a main electrical circuit between the armatures of said generator and motor groups, and means whereby the circuit exciting the generator group and said main electrical circuit, cooperate to produce a resisting torque in the said moving part, to resist said biasing action in proportion to the resisting torque of the generator group, and to reduce the field intensity in the generator group and increase that of the electric motor group, whenever the electromagnetic resisting torque on the movable part exceeds the biasing action of the control device.

5. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits having controls therein for separately exciting said groups, each said control, of a circuit comprising parts relatively movable to each other, said control device being connected with one part of the controls for the exciter circuits, moving said part relative to said other part thereof, for varying the fluxes in the exciters upon variation of energy supply to the primary source, a regulating member having a moving part connected with the other part of the controls of said exciter circuit, said moving part being so connected to the control device as to be biased thereby in one direction to an extent dependent upon the position of said control device, and electrical means connected so as to respond to generator circuits, cooperating with said moving part of the regulating member to resist said biasing action in proportion to the resisting torque of the generator group, and to move the parts of said controls relative to each other in such manner as to reduce the field intensity in the generator group and increase that of the electric motor group whenever the electro-magnetic resisting torque on the movable part exceeds the biasing action of the control device, said moving part being connected with said other part of the controls of said exciter circuit in such manner that upon movement of the moving part, the variation of flux in the exciter for the generator group under the actuation of the control for its exciter circuit is different from that in the exciter for the motor group, under the actuation of the control for its exciter circuit, and means actuated by said control device for varying, depending upon the amount of energy supply to the prime mover, the amount by which a given movement of the moving part can vary the control in the exciter for the motor group.

6. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits having controls therein for separately exciting said groups, each said control of a circuit comprising parts relatively movable to each other, said control device being connected with one part of the controls for the exciter circuits, moving said part relative to said other part thereof, for varying the fluxes in the exciters upon variation of energy supply to the prime mover, a regulating member having a moving part connected with the other part of the controls of said exciter circuit, said moving part being so connected to the control device as to be biased thereby in one direction to an extent dependent upon the position of said control device, electrical means connected so as to respond to generator circuits, cooperating with said moving part of the regulating member to resist said biasing action in proportion to the resisting torque of the generator group, and to move the parts of said controls relative to each other in such manner as to reduce the field intensity in the generator group and increase that of the electric motor group whenever the electro-magnetic resisting torque on the movable part exceeds the biasing action of the control device, said moving part being connected with said other part of the controls of said exciter circuit, reversing means having a variable pivot point being interposed in the connection to the said other part of one said control, to cause movement of that part in a direction opposite to the movement of the corresponding part of the other control, whereby, upon movement of said moving part of the regulating member, the variation of flux in the exciter for the generator group under the actuation of the control for its exciter circuit is different from that in the exciter for the motor group under the actuation of the control for its exciter circuit, and means actuated by said control device for moving, depending upon the amount of energy supply to the prime mover, the pivot point of said reversing means, thereby varying the amount by which a given movement of the moving part can vary the control in the exciter for the motor group.

7. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits each having resistances therein for separately exciting said groups, a regulating member having a moving part, means connecting said moving part directly with the resistance in the circuit for exciting the generator group, and also connecting it with the resistance in the circuit for exciting the motor group, means including an elastic element connecting with said moving part of the regulating device, dampening means for smoothing the action of said elastic element and also connected at one end to said moving part, means actuated by said control device for moving the elastic element and its dampening means to increase the tension thereon, upon movement of the control device in a direction to increase the energy supply, to set up torque in one direction on said moving part, and electrical means connected so as to respond to current flow through the generator group and its exciter, cooperating with said moving part of the regulating member, to resist said torque in proportion to the resisting torque of the generator group, and to swing said moving part against said torque, to reduce the field intensity in the generator group and to increase that of the electric motor group, whenever the electromagnetic resisting torque on the movable part exceeds that of the elastic member, and means controlled by said control device and interposed in the connecting means between said moving part and the second-mentioned resistance, for varying the regulation thereof by the regulating member in response to a given movement of the moving part thereof, in dependence upon the position of the control member.

8. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits each having resistances therein for separately exciting said groups, a regulating member having a moving part, means connecting said moving part directly with the resistance in the circuit for exciting the generator group, and also connecting it with the resistance in the circuit for exciting the motor group, a transmission lever interposed in the connecting means between said moving part and the second-mentioned resistance, and a pivot on which said transmission lever is mounted for longitudinal movement relative thereto, means connecting said pivot with said control device for moving the position of said pivot upon movement of the control device, the regulation of the second-mentioned resistance in response to a given movement of the moving part thereof depending on the instantaneous position of the control device.

9. Apparatus for the transformation of energy, comprising a primary source of mechanical power, means for varying the energy supply thereto, a control device for said means, an electric generator group coupled to and driven by said primary source, an electric motor group driven by said generator group, said motor group having driven means driven thereby, exciter circuits for said generator and motor groups, controls for said exciter circuits, means for increasing the current flow through the exciter circuit for the motor group to exert a retarding action on the latter, electrical connections between said generator and motor groups and said means, a regulating member having a moving part and including said means, means connecting said controls with said control device for varying the resistance characteristics of the exciter circuits, thereby varying the current output of the generator group, upon variation in energy supply to the prime mover, the moving part of said regulator also being connected with the controls of said exciter circuits, means connecting said moving part with said control device to bias the former to an extent dependent on the position of the control device, and electrical means, of which said electrical connections constitute part, and which are responsive to currents flowing in the parts of said apparatus, acting on said moving part for developing a resisting torque acting contrary to the biasing action, and causing the movement of said moving part, whenever the resisting torque overcomes the biasing action, in a direction whereby the moving part actuates said controls to cause a reduction of field intensity for the generator group and an increase of that for the motor group.

10. Apparatus for the transformation of energy, comprising a primary source of mechanical power, means for varying the energy supply thereto, a control device for said means, an electric generator group coupled to and driven by said primary source, an electric motor group driven by said generator group, said motor group having driven means driven thereby, exciter circuits for said generator and motor groups, controls for said exciter circuits, means for increasing the current flow through the exciter circuit for the motor group to exert a retarding action on the latter, electrical connections between said generator and motor groups and said means, a regulating member having a moving part and including said means, means connecting said controls with said control device for varying the resistance characteristics of the exciter circuits, thereby varying the current output of the generator group, upon variation in energy supply to the prime mover, the moving part of said regulator also being connected with the controls of said exciter circuits, means connecting said moving part with said control device to bias the former to an extent dependent on the position of the control device, electrical means, of which said electrical connections constitute part, and which are responsive to currents flowing in the parts of said apparatus, acting on said moving part for developing a resisting torque acting contrary to the biasing action, and causing the movement of said moving part, whenever the resisting torque overcomes the biasing action, in a direction whereby the moving part actuates said controls to cause a reduction of field intensity for the generator group and an increase of that for the motor group, a braking resistance shunted across and normally in open-circuit relation with said motor group, a switch in the electrical connections between the generator and motor groups, a braking control, and means under the control of said braking control for throwing said switch to disconnect said motor group from said electrical connections and to connect it across said braking resistance when braking is desired.

11. Apparatus for the transformation of energy, comprising a primary source of mechanical power, means for varying the energy supply thereto, a control device for said means, an electric generator group, an electric motor group driven by said generator group, said motor group having driven means driven thereby, an exciter for the generator group and an exciter for the motor group, said exciters and the generator group all being directly coupled with and driven by said primary source, circuits for said exciters, controls for said exciter circuits, means for increasing the current flow through the exciter circuit for the motor group to exert a retarding action on the latter, electrical connections between said generator and motor groups and said means, a regulating member having a moving part and including said means, means for connecting said controls with said control device for varying the resistance characteristics of the exciter circuits, thereby varying the current output of the generator group, upon variation in energy output to the prime mover, the moving part of said regulator also being connected with the controls of said exciter circuits, means connecting said moving part with said control device to bias the former to an extent dependent on the position of the control device, and electrical means, of which said electrical connections constitute part, and which are responsive to currents flowing in the parts of said apparatus, acting on said moving part for developing a resisting torque acting contrary to the biasing action, and causing the movement of said moving part, whenever the resisting torque overcomes the biasing action, in a direction whereby the moving part actuates said controls to cause a reduction of field intensity for the generator group and an increase of that for the motor group.

12. Apparatus for the transformation of energy, comprising a primary source of mechanical power, means for varying the energy supply thereto, a control device for said means, an electric generator group driven by and coupled to said primary source, an electric motor group driven by said generator group, said motor group having driven means driven thereby, exciter circuits for said generator and motor groups, controls for said exciter circuits, means for increasing the current flow through the exciter circuit for the motor group to exert a retarding action on the latter, electrical connections between said generator and motor groups and said means, a regulating member having a moving part and including said means, means connecting said controls with said control device for varying the resistance characteristics of the exciter circuits, thereby varying the current output of the generator group, upon variation in energy supply to the prime mover, the moving part of said regulator also being connected with the controls of said exciter circuits, means connecting said moving part with said control device to bias the former to an extent dependent on the position of the control device, electrical means, of which said electrical connections constitute part, and which are responsive to currents flowing in the parts of said apparatus, acting on said moving part for developing a resisting torque acting contrary to the biasing action, and causing the movement of said moving part, whenever the resisting torque overcomes the biasing action, in a direction whereby the moving part actuates said controls to cause a reduction of field intensity for the generator group and an increase of that for the motor group, a braking control, means in the circuit of the exciter for the motor group, responsive to said braking control, for increasing the exciting current to the motor group upon actuation of the motor group, and means interconnecting said brake control and said means for varying the energy supply to said primary source, in such manner that at the last part of the brake control action, the energy supply to said primary source is increased.

13. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits having controls therein for separately exciting said groups, said control device being connected with the controls of the exciter circuits for varying the fluxes in the exciters upon variation of energy supply to the prime mover, switching means in circuit with one of said exciter circuits and operable at will, for reversing current flow therethrough, relative to current flow in the other exciter circuit, to reverse the direction of rotation of the motor group, a regulating member also connected with the controls of said exciter circuits and having a moving part so connected to the control device as to be biased thereby in one direction to an extent dependent upon the position of said control device, and electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device.

14. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said generator and motor groups each having any desired number of units therein, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and means responsive in part to movement of said control device and in part to movement of said moving part of the regulating member, for changing the connections among themselves of the units of desired ones of said motor and generator groups for varying the power output, to provide for automatic operation of the apparatus to the extent that such change of connections accomplishes that end.

15. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said motor group having a plurality of units therein for separately exciting said groups, said control device being connected with the controls of the exciter circuits for varying the fluxes in the exciters upon variations of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and means, under the control of said control device, coming into operation when said control device approaches its limit position for maximum energy supply, tending to connect the units of the motor group in parallel, for operation at high speeds and low torque.

16. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said motor group having a plurality of units therein for separately exciting said groups, said control device being connected with the controls of the exciter circuits for varying the fluxes in the exciters upon variation of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and means, under the control of both said control device and said moving part, coming into operation when said control device approaches its limit position of maximum energy supply and at the same time, the resisting torque of the said electrical means is small relative to the biasing action of said control device, for connecting the units of the motor group in parallel, for operation at high speeds and low torque.

17. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said generator and motor groups each having any desired number of units therein, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and means responsive in part to movement of said control device and in part to movement of said moving part of the regulating member, for changing the connections among themselves of the field windings of the units of desired ones of said motor and generator groups for varying the power output, to provide for automatic operation of the apparatus to the extent that such change of connections accomplishes this end.

18. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said generator and motor groups each having any desired number of units therein, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, means, under the control of both said control device and said moving part, coming into operation when said control device approaches its limit position for maximum energy supply and at the same time the resisting torque of the said electrical means is small relative to the biasing action of said control device, for changing among themselves the connections of the field windings of the generator group, and means similar to said last-mentioned means, for connecting the fields of the units of the motor group in series, to provide for automatic operation of the apparatus to the extent that such change of connections accomplishes that end.

19. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said generator and motor groups each having any desired number of units therein, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, braking means for braking the motor group, means in the exciter circuit for said motor group and cooperating with said braking means, for increasing the current flow in said exciter circuit upon actuation of said braking means, means actuated by said braking means tending to change the electrical connections among themselves of the units of a desired one of said generator and motor groups to adapt the apparatus to the instantaneous load demand, and connections whereby the control action of said last-mentioned means depends in part on the position of said control device and in part on the position of the moving part of the regulating member.

20. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, said generator and motor groups each having any desired number of units therein, circuits having controls therein for separately exciting said groups, said control device being connected with the controls of the exciter circuits for varying the fluxes in the exciters upon variation of energy supply to the prime mover, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and a plurality of means including contacts in circuit with said control device and the moving part of said regulator for moving among themselves both the field and the armature connections for both the generator and motor groups in such manner that, under positions of said control device and said moving part corresponding to starting and high torques, the units of the generator group and the fields of the motor group are each connected in parallel while the units of the motor group and the fields of the generator group are each connected in series; while upon further actuation of the control device, corresponding to normal operation at medium load demand, the units of the generator group and the fields of both the generator and motor groups are each connected in series, while the motor units are connected in series-parallel; while upon still further movement of said control device, corresponding to high speed and low torque, the units of the generator group and the fields of the units of the motor group are each connected in series, while the units of the motor group and the fields of the units of the generator group are each connected in parallel.

21. Apparatus for the transformation of energy, comprising a primary source of mechanical power, means for varying the energy supply thereto, a control device for said means, an electrical generator group driven by said primary source, an electric motor group comprising a plurality of units divided into at least two sub-groups, at least one motor unit for each said sub-group, an exciter for said generator group and at least one separate exciter for each said motor sub-group, said exciters all being mechanically coupled to said primary source, circuits having controls therein for energizing said exciters, said motor group being electrically connected to the said generator group, means operable at will and connected in said exciter-energizing circuits for varying independently the value and direction of excitation of the exciters in each motor sub-group, so that available energy can be distributed in any desired proportion among the sub-groups of said motor group, a regulating member also connected with the controls of said exciter circuits and having a moving part so connected to the control device as to be biased thereby in one direction to an extent dependent upon the position of said control device, and electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device.

22. Apparatus for the transformation of energy, comprising a primary source of mechanical power, means for varying the energy supply thereto, a control device for said means, an electrical generator group driven by said primary source, an electric motor group comprising a plurality of units divided into at least two sub-groups, at least one motor unit for each said sub-group, an exciter for said generator group and at least one separate exciter for each said motor sub-group, said exciters all being mechanically coupled to said primary source, circuits having controls therein for energizing said exciters, said motor group being electrically connected to the said generator group, a change-over switch in each exciter-energizing circuit and operable at will, for varying independently the value and direction of excitation of the exciters in the corresponding motor sub-group, so that available electrical energy can be distributed in any desired proportion among the sub-groups of said motor group, and to determine independently and at will the direction of rotation of the units of each said sub-group, a regulating member also connected with the controls of said exciter circuits and having a moving part so connected to the control device as to be biased thereby in one direction to an extent dependent upon the position of said control device, and electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device.

23. Apparatus for the transformation of energy, comprising a primary source of mechanical power, means for varying the energy supply thereto, a control device for said means, an electrical generator group driven by said primary source, an electric motor group comprising a plurality of units divided into at least two sub-groups, at least one motor unit for each said sub-group, an exciter for said generator group and at least one separate exciter for each said motor sub-group, said exciters all being mechanically connected to said primary source, circuits having controls therein for energizing said exciters, said motor group being electrically connected to the said generator group, a change-over switch and a corresponding resistance element under the control thereof in each exciter-energizing circuit and operable at will, for varying independently the value and direction of excitation of the exciter in corresponding motor sub-group, so that available electrical energy can be distributed in any desired proportion among the sub-groups of said motor group, to determine the torque supplied thereby, and to determine independently and at will the direction of rotation of the units of each said sub-group, a regulating member also connected with the controls of said exciter circuits and having a moving part so connected to the control device as to be biased thereby in one direction to an extent dependent upon the position of said control device, and electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device.

24. Apparatus for the transformation of energy, comprising a primary source of mechanical power, means for varying the energy supply thereto, a control device for said means, an electrical generator group driven by said primary source, an electric motor group comprising a plurality of units divided into at least two sub-groups, at least one motor unit for each said sub-group, an exciter for said generator group and at least one separate exciter for each said motor sub-group, said exciters all being mechanically connected to said primary source, circuits having controls therein for energizing said exciters, said motor group being electrically connected to the said generator group, a change-over switch and a corresponding resistance element under the control thereof in each exciter-energizing circuit and operable at will, for varying independently the value and direction of excitation of the exciter in the corresponding motor sub-group, so that available electrical energy can be distributed in any desired proportion among the sub-groups of said motor group, to determine the torque supplied thereby, and to determine independently and at will the direction of rotation of the units of each said sub-group, a regulating member also connected with the controls of said exciter circuits and having a moving part so connected to the control device as to be biased thereby in one direction to an extent dependent upon the position of said control device, electrical braking means normally in a shunted, broken-circuit relation with said motor units, a braking switch normally maintaining the electrical connections between said generator and motor groups, electrical means in circuit with said change-over switches and capable of energization when said change-over switches are in their rest position corresponding to inactivity of the apparatus, to throw said braking switch on to said braking means, in order to disconnect the generator and motor groups and to close the motor group on said braking means, the circuit of said electrical means being broken, and the motor group being closed on the generator group when the change-over switches are moved from their rest positions, and electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device.

25. Apparatus for the transformation of energy, comprising a primary source of mechanical power, means for varying the energy supply thereto, a control device for said means, an electrical generator group driven by said primary source, an electrical motor group comprising a plurality of units divided into at least two sub-groups, at least one motor unit for each said sub-group, an exciter for said generator group and at least one separate exciter for each said motor sub-group, said exciters all being mechanically connected to said primary source, circuits having controls therein for energizing said exciters, said motor group being electrically connected to the said generator group, a change-over switch and a corresponding resistance element under the control thereof in each exciter-energizing circuit and operable at will, for varying independently the value and direction of excitation of the exciter in corresponding motor sub-group, so that available electrical energy can be distributed in any desired proportion among the sub-groups of said motor group, to determine the torque supplied thereby, and to determine independently and at will the direction of rotation of the units of each said sub-group, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and electrical means responsive to positions of said control device and said moving part of the regulating member for varying the intercoupling of the sub-groups of the motor group upon variation in the load demands on said motor group, said change-over switches being interposed in the circuit of said electrical means, whereby said electrical means are inoperative except when the said change-over switches are in predetermined positions.

26. Apparatus for the transformation of energy, comprising a primary source of mechanical power, means for varying the energy supply thereto, a control device for said means, an electrical generator group driven by said primary source, an electric motor group comprising a plurality of units divided into at least two sub-groups, at least one motor unit for each said sub-group, an exciter for said generator group and at least one separate exciter for each said motor sub-group, said exciters all being mechanically coupled to said primary source, circuits having controls therein for energizing said exciters, said motor group being electrically connected to the said generator group, means operable at will and connected in said exciter-energizing circuits for varying independently the value and direction of excitation of the exciters in each motor sub-group, so that available energy can be distributed in any desired proportion among the sub-groups of said motor group, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, and electrical means for varying the intercoupling of the units of the motor group to adapt them best for the instantaneous load demands, said electrical means being so connected as to be responsive in part to the position of said control device, and in part to the position of said means for varying the excitation of the exciter for the motor sub-group.

27. Apparatus for the transformation of energy, comprising a primary source of mechanical power, means for varying the energy supply thereto, a control device for said means, an electrical generator group driven by said primary source, an electric motor group comprising a plurality of units divided into sub-groups, at least one motor unit for each said sub-group, an exciter for said generator group and at least one separate exciter for each said motor sub-group, said exciters all being mechanically coupled to said primary source, circuits having controls therein for energizing said exciters, said motor group being electrically connected to the said generator groups, a change-over switch controlling each said exciter circuit, and operable at will, for varying independently both the value and the direction of excitation of the exciters in each motor sub-group, so that available energy can be distributed in any desired proportion among the sub-groups of said motor group, and so that the direction of rotation of the units of each sub-group can be determined at will and independently of the other sub-group, a regulating member also connected with the controls of said exciter circuits and having a moving part so connected to the control device as to be biased thereby in one direction to an extent dependent upon the position of said control device, and electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device.

28. Apparatus for the transformation of energy, comprising a primary source of mechanical power, means for varying the energy supply thereto, a control device for said means, an electrical generator group driven by said primary source, an electric motor group comprising a plurality of units divided into sub-groups, at least one motor unit for each said sub-group, an exciter for said generator group and at least one separate exciter for each said motor sub-group, said exciters all being mechanically coupled to said primary source, circuits having controls therein for energizing said exciters, said motor group being electrically connected to the said generator group, a change-over switch controlling each said exciter circuit, and operable at will, for varying independently both the value and the direction of excitation of the exciters in each motor sub-group, so that available energy can be distributed in any desired proportion among the sub-groups of said motor group, and so that the direction of rotation of the units of each sub-group can be determined at will and independently of the other sub-group, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, a braking member for said apparatus, means under the control of said braking member for opening, upon actuation of the latter, the electrical connections between said generator and motor groups, and connections between said change-over switches and said braking member whereby, immediately upon manipulation of the latter, each change-over switch is connected to control the field energization of the motor sub-group normally controlled by the other change-over switch.

29. Apparatus for the transformation of energy, comprising a primary source of mechanical power, means for varying the energy supply thereto, a control device for said means, an electrical generator group driven by said primary source, an electric motor group comprising a plurality of units divided into sub-groups, at least one motor unit for each said sub-group, an exciter for said generator group and at least one separate exciter for each said motor sub-group, said exciters all being mechanically coupled to said primary source, circuits having controls therein for energizing said exciters, said motor group being electrically connected to the said generator group, a change-over switch controlling each said exciter circuit, and operable at will, for varying independently both the value and the direction of excitation of the exciters in each motor sub-group, so that available energy can be distributed in any desired proportion among the sub-groups of said motor group, and so that the direction of rotation of the units of each sub-group can be determined at will and independently of the other sub-group, a regulating member also connected with the controls of said exciter circuits and having a moving part so connected to the control device as to be biased thereby in one direction to an extent dependent upon the position of said control device, electrical means connected so as to respond to generator currents, cooperating with said moving part of the regulating member, to resist said biasing action in proportion to the resisting torque of the generator group, and to reduce the field intensity in the generator group and increase that of the electric motor group whenever the electromagnetic resisting torque on the movable part exceeds the biasing action of the control device, a braking member for said apparatus, means under the control of said braking member for opening, upon actuation of the latter, the electrical connections between said generator and motor groups, and connections between said change-over switches and said braking member whereby, immediately upon manipulation of the latter, each change-over switch is connected to control the field energization of the motor sub-group normally controlled by the other change-over switch, means for changing the intercouplings of the units of said motor group, and connections between said last-mentioned means and said braking member for changing the said means upon manipulation of said braking member.

30. Apparatus for the transformation of energy, comprising a primary source of mechanical power, means for varying the energy supply thereto, a control device for said means, an electrical generator group driven by said primary source, an electric motor group driven by said generator group, said motor group having driven means driven thereby, circuits having controls therein for separately exciting said groups, each said control of a circuit comprising parts movable relative to each other, said control device being connected with one part of the controls of the exciter circuits, moving said part relative to said other part thereof, for varying the fluxes in the exciters upon variation of energy supply to the primary source, a regulating member having a moving part connected with the other part of the controls of said exciter circuits, said moving part being so connected to the control device as to be biased thereby in one direction to an extent dependent upon the position of said control device, and electrical means connected so as to respond to generator circuits, cooperating with said moving part of the regulating member to resist said biasing action in proportion to the resisting torque of the generator group, and to move the parts of said controls relative to each other in such manner as to reduce the field intensity in the generator group and increase that of the electric motor group whenever the electromagnetic resisting torque on the movable part exceeds the biasing action of the control device.

EMMANUEL COURCOULAS.